United States Patent
Honda et al.

(10) Patent No.: US 7,382,729 B2
(45) Date of Patent: Jun. 3, 2008

(54) VIDEO TRANSMISSION OF LAYERED CODED DATA

(75) Inventors: Yoshimasa Honda, Kamakura (JP); Tsutomu Uenoyama, Kawasaki (JP)

(73) Assignee: Matsushita Electric Industrial Co., Inc., Osaka (JP)

( * ) Notice: Subject to any disclaimer, the term of this patent is extended or adjusted under 35 U.S.C. 154(b) by 583 days.

(21) Appl. No.: 10/514,440

(22) PCT Filed: Feb. 20, 2004

(86) PCT No.: PCT/JP2004/001988

§ 371 (c)(1),
(2), (4) Date: Nov. 16, 2004

(87) PCT Pub. No.: WO2004/077831

PCT Pub. Date: Sep. 10, 2004

(65) Prior Publication Data

US 2005/0175084 A1    Aug. 11, 2005

(51) Int. Cl.
- H04J 1/16 (2006.01)
- H04J 3/16 (2006.01)
- H04B 1/66 (2006.01)
- H04N 7/16 (2006.01)
- G06F 15/173 (2006.01)
- G06F 15/16 (2006.01)

(52) U.S. Cl. .................. 370/235; 370/252; 370/465; 348/E5.103; 375/240.01; 725/136; 725/144; 725/151; 709/240; 709/233

(58) Field of Classification Search ........ 370/230–232, 370/235, 465; 348/E5.103; 375/240.1–240.29; 725/136, 144, 151, 240, 232, 233
See application file for complete search history.

(56) References Cited

U.S. PATENT DOCUMENTS

| 4,903,125 | A |   | 2/1990  | Parker |
|-----------|---|---|---------|--------|
| 5,148,272 | A | * | 9/1992  | Acampora et al. ....... 375/240.1 |
| 5,231,384 | A | * | 7/1993  | Kuriacose ................ 348/426.1 |
| 5,502,571 | A | * | 3/1996  | Decotignie et al. ......... 386/112 |
| 6,148,005 | A | * | 11/2000 | Paul et al. .................. 370/469 |
| 6,996,097 | B1| * | 2/2006  | Chou et al. ................ 370/389 |

(Continued)

FOREIGN PATENT DOCUMENTS

JP    63-73786 A    4/1988

(Continued)

*Primary Examiner*—Huy D. Vu
*Assistant Examiner*—Nittaya Juntima
(74) *Attorney, Agent, or Firm*—The Nath Law Group; Jerald L. Meyer; Stanley N. Protigal

(57) ABSTRACT

A video transmission system, a video transmitting apparatus, a video receiving apparatus, and a video transmission method whereby, when a plurality of terminals whose characteristics differ receive video simultaneously, each terminal can receive video with quality appropriate for that terminal. In this system, a video transmitting apparatus (100) divides layered-coded data by quality and bit rate by means of a channel division section (106), and transmits data on separate channels from a video transmitting section (108) after adding priorities calculated by a priority calculation section (112). Video transmitting apparatus (100) also groups channels by quality and calculates a group list by means of a group list calculation section (114), and transmits this group list from a group list transmitting section (116).

14 Claims, 19 Drawing Sheets

U.S. PATENT DOCUMENTS

| | | | |
|---|---|---|---|
| 7,093,028 B1* | 8/2006 | Shao et al. ................. 709/240 |
| 7,245,663 B2* | 7/2007 | Van Der Schaar et al. ................... 375/240.26 |
| 2002/0003798 A1* | 1/2002 | Sato et al. ................... 370/390 |
| 2002/0072966 A1* | 6/2002 | Eldering et al. .............. 705/14 |
| 2004/0226050 A1* | 11/2004 | Matsuzaki et al. .......... 725/135 |
| 2005/0175104 A1* | 8/2005 | Honda et al. ......... 375/240.18 |
| 2006/0262861 A1* | 11/2006 | Kobayashi ............ 375/240.24 |
| 2007/0133675 A1* | 6/2007 | Honda et al. ............ 375/240.1 |

FOREIGN PATENT DOCUMENTS

| | | |
|---|---|---|
| JP | 04-100494 | 4/1992 |
| JP | 2744783 B2 | 2/1998 |
| JP | 11-313301 A | 11/1999 |
| JP | 2001-45436 A | 2/2001 |
| JP | 2003-333594 A | 11/2003 |

\* cited by examiner

EL1　　EL2　　EL3　　EL4

BL

VIDEO TRANSMISSION OF LAYERED CODED DATA

TECHNICAL FIELD

The present invention relates to a video transmission system that transmits video via a network.

BACKGROUND ART

Video data transmitted by a conventional video transmission system is normally compression-coded into a fixed bit rate or below by means of a method such as H.261 or MPEG (Moving Picture Experts Group) so that it can be transmitted in a fixed transmission bit rate, and once video data has been coded the video quality cannot be changed even if the transmission bit rate changes.

However, with the diversification of networks in recent years, transmission path bit rate fluctuations have become large, and video data has become necessary that enables video transmission at quality commensurate with a plurality of bit rates. In response to this need, layered coding methods have been standardized that have a layered structure and can handle a plurality of bit rates. Among such layered coding methods, recently standardized MPEG-4 FGS (Fine Granularity Scalability) in particular, is a layered coding method with a high degree of freedom regarding bit rate selection. Video data coded by MPEG-4 FGS is composed of a base layer, which is a moving picture stream for which standalone decoding is possible, and at least one enhancement layer, which is a moving picture stream for improving base layer decoded moving picture quality. The base layer is video data of low picture quality in a low bit rate, and a high degree of flexibility in achieving high picture quality is possible by matching the enhancement layer to the bit rate.

In MPEG-4 FGS, the total data size of an enhancement layer to be transmitted can be controlled to allow application to a variety of bit rates, and it is possible to transmit video of quality that is in accordance with the bit rate.

However, when video is received simultaneously by a plurality of terminals, since the capabilities of terminals receiving the video and the characteristics (reception area) of the network used by each terminal differ, there is a problem in that the quality deemed to be necessary for each terminal is different. Here, "quality" includes, for example, image quality, frame rate (smoothness of motion), error resilience, spatial resolution, delay, processing complexity, and so forth.

With regard to this point, a technology for performing video transmission at appropriate quality according to network characteristics for a terminal for which the network status fluctuates due to network congestion or the like is one that divides a video stream into layers and transmits these layers on channels with different priorities (see, for example, page 1 and FIG. 1 of Unexamined Japanese Patent Publication No. HEI 4-100494).

FIG. 1 is a drawing showing an example of the configuration of a conventional video coding apparatus. In this video coding apparatus 10, a video coding circuit 12 performs video coding on an input video signal using motion compensation, DCT (discrete cosine transform), and quantization, and outputs coded data to a layering circuit 14. Layering circuit 14 divides coded data input from video coding circuit 12 into M areas in N×N-pixel block units used in DCT (where N and M are both natural numbers), and outputs M coded data to a packetizing buffer 16. In the data division by layering circuit 14, image quality degradation that occurs when a particular area among the M areas is discarded is measured, and the area size is controlled so that this degradation becomes equal to a permitted value set beforehand. With respect to divided coded data input from layering circuit 14, packetizing buffer 16 transmits an area containing a low-frequency component on a high-priority channel.

Thus, in video coding apparatus 10, by subjecting DCT coefficients to area division, and transmitting from a low-frequency component on a high-priority channel, video can be received with image quality in accordance with a bit rate even when network congestion occurs since coded data in a low-priority channel is discarded.

However, with the above-described conventional technology, although it is possible to receive video with image quality in accordance with the transmission bit rate, a plurality of terminals cannot individually freely select the type of quality (such as image quality, smoothness of motion, error resilience, spatial resolution, or processing complexity as described above, for example) to be given priority.

For example, within a limited transmission bit rate, it is preferable for a terminal with a large display screen to receive video with priority given to high image quality of successive images even if motion is not smooth, rather than video with smooth motion but low image quality. Conversely, in the case of a terminal with a small display screen, it is preferable to receive video of low image quality but with smooth motion rather than video of high image quality but lacking smooth motion. Also, in the case of a terminal in a radio environment in which there is a high error rate on the network, it is preferable to receive video with high error resilience that can be played back under conditions in which errors occur, rather than video with low error resilience that can only be played back under error-free conditions.

Thus, when video is received simultaneously by a plurality of terminals whose characteristics (terminal performance or reception bit rate) differ, it is deemed necessary for a terminal to be able to freely select the type and level of video quality, and to be able to receive video of appropriate quality according to the terminal's characteristics and conditions.

DISCLOSURE OF INVENTION

It is an object of the present invention to provide a video transmission system whereby, when a plurality of terminals whose characteristics differ receive video simultaneously, each terminal can receive video with quality appropriate for that terminal.

According to one aspect of the present invention, in a video transmission system whereby layered-coded data is transmitted from a video transmitting apparatus to a video receiving apparatus via a network, the video transmitting apparatus has a division section that divides layered-coded data into separate channels by quality or by quality and bit rate, a first transmitting section that transmits divided layered-coded data on mutually separate channels, a calculation section that groups channels by quality and calculates a group list, and a second transmitting section that transmits a calculated group list, and the video receiving apparatus has a first receiving section that receives a group list transmitted from the video transmitting apparatus, a determination section that determines a reception channel using a received group list, and a second receiving section that receives data of a determined reception channel among divided layered-coded data transmitted from the video transmitting apparatus.

According to another aspect of the present invention, a video transmitting apparatus has a division section that divides layered-coded data into separate channels by quality or by quality and bit rate, a first transmitting section that transmits divided layered-coded data on mutually separate channels, a calculation section that groups channels by quality and calculates a group list, and a second transmitting section that transmits a calculated group list.

According to yet another aspect of the present invention, a video transmission method whereby layered-coded data is transmitted from a video transmitting apparatus to a video receiving apparatus via a network has a step whereby the video transmitting apparatus divides layered-coded data into separate channels by quality or by quality and bit rate, a step whereby the video transmitting apparatus transmits divided layered-coded data on mutually separate channels, a step whereby the video transmitting apparatus groups channels by quality and calculates a group list, a step whereby the video transmitting apparatus transmits a calculated group list, a step whereby the video receiving apparatus receives a group list transmitted from the video transmitting apparatus, a step whereby the video receiving apparatus determines a reception channel using a received group list, and a step whereby the video receiving apparatus receives data of a determined reception channel among divided layered-coded data transmitted from the video transmitting apparatus.

BEST MODE FOR CARRYING OUT THE INVENTION

The gist of the present invention is that, in a system that transmits a layered-coded video stream, by dividing that layered-coded video stream by quality or by quality and bit rate and transmitting the results on separate channels, and also grouping channels by quality and transmitting a list thereof, it is possible for a plurality of terminals to select the reception quality of their respective video, and receive video with appropriate quality.

Also, by performing transmission at this time with priorities assigned to channels according to quality given priority (at this time, a network node performs packet transmission according to priority), it is possible, in a limited bit rate, for a receiving terminal to select a group of quality given priority, and to receive video of the highest quality automatically.

With reference now to the accompanying drawings, embodiments of the present invention will be explained in detail below.

Embodiment 1

In this embodiment, a video transmitting apparatus is described whereby, by performing channel division of layered-coded data by quality and bit rate and transmitting data on separate channels after adding a priority calculated using terminal information, and also transmitting a group list in which channels are grouped by quality, a receiving terminal can select quality to be given priority, and can receive video with quality appropriate to terminal characteristics according to network conditions.

Figure 1:
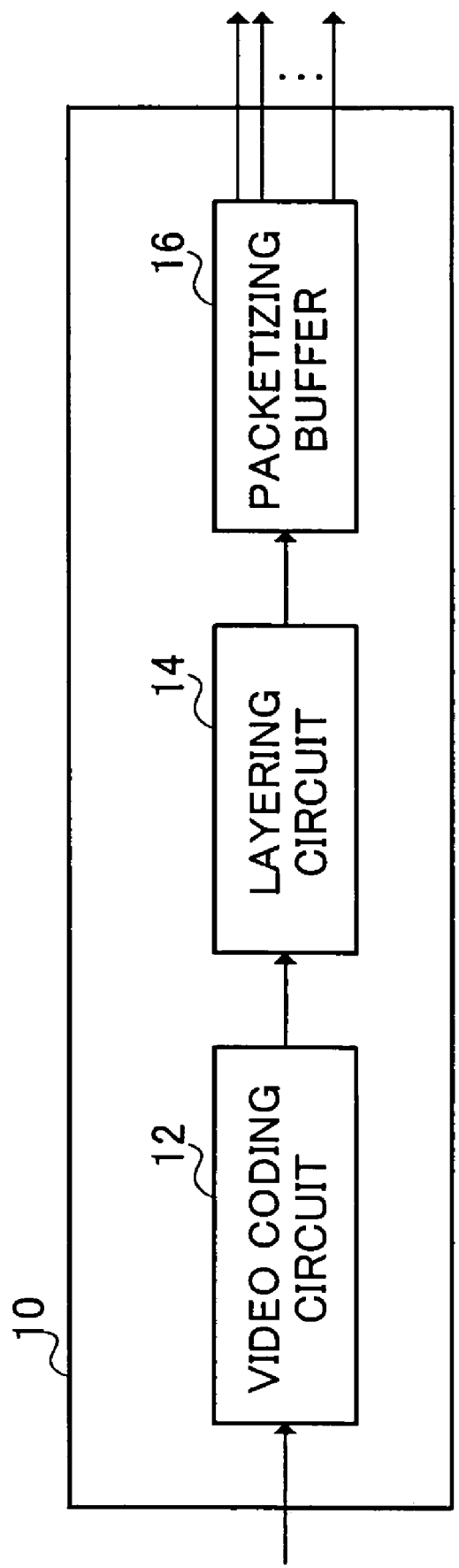
FIG. 1 is a drawing showing an example of the configuration of a conventional video coding apparatus.
Figure 2:
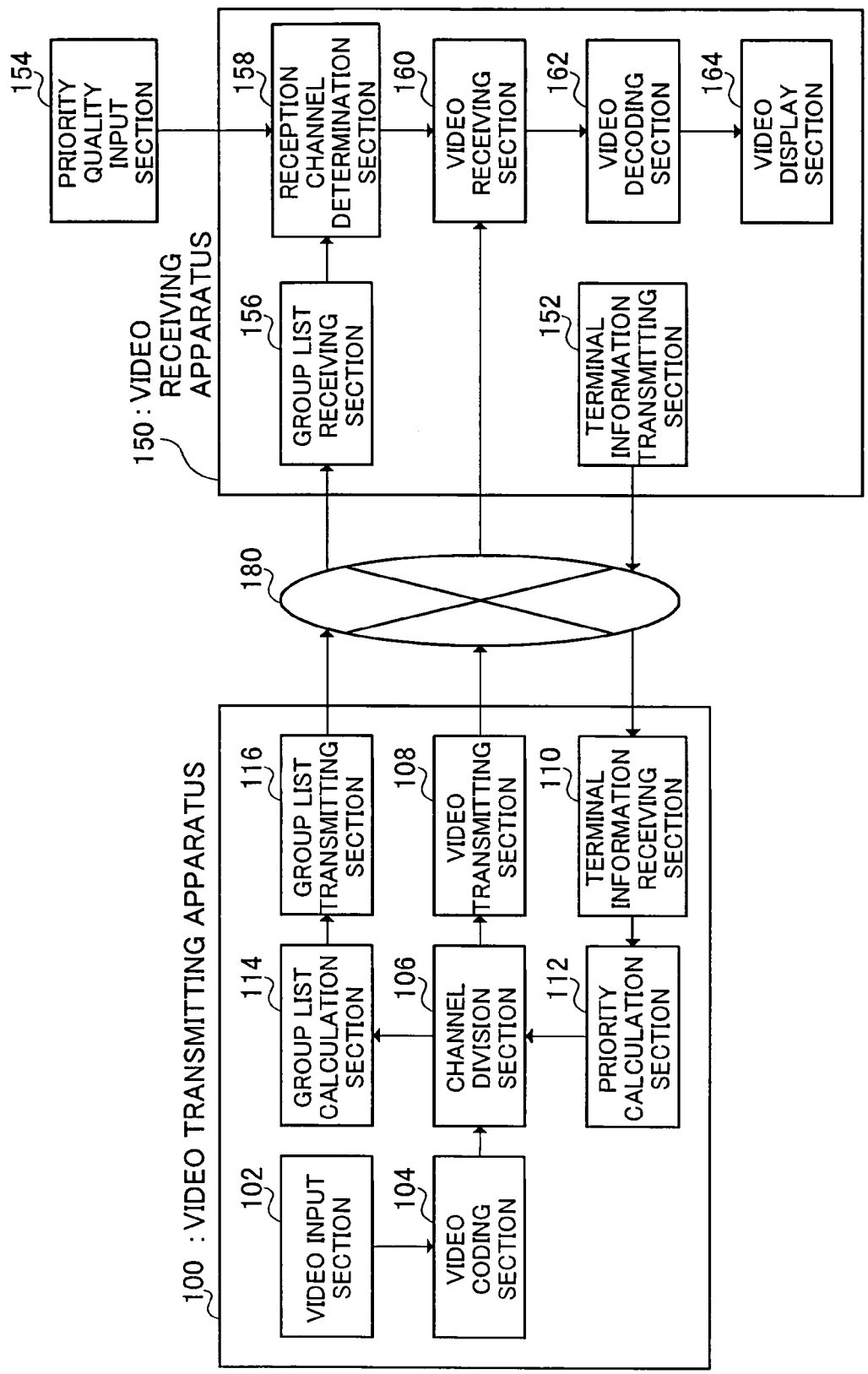
FIG. 2 is a drawing showing the configuration of a video transmission system according to Embodiment 1 of the present invention.

FIG. 2 is a drawing showing the configuration of a video transmission system according to Embodiment 1 of the present invention.

This video transmission system has a video transmitting apparatus (hereinafter also referred to as "transmitting terminal") 100 that transmits video, a video receiving apparatus (hereinafter also referred to as "receiving terminal") 150 that receives video, and a network 180 that relays video transmitted from video transmitting apparatus 100 to video receiving apparatus 150. That is to say, video transmitted from video transmitting apparatus 100 is transmitted to video receiving apparatus 150 via network 180.

Video transmitting apparatus 100 has a video input section 102, video coding section 104, channel division section 106, video transmitting section 108, terminal information receiving section 110, priority calculation section 112, group list calculation section 114, and group list transmitting section 116.

Video input section 102 outputs images making up video provided from outside or generated by the relevant apparatus 100 to video coding section 104 on a frame-by-frame basis.

Video coding section 104 performs layered coding, with an image output from video input section 102 as an input image, and outputs the obtained coded data to channel division section 106.

Figure 3:
FIG. 3 is a drawing showing an example of the structure of coded data when MPEG-4 FGS coding is used.
Figure 3:
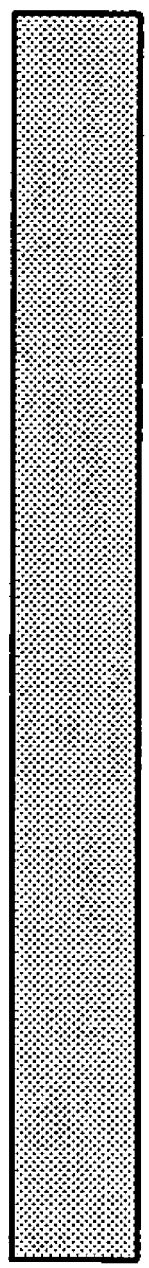
Figure 3:
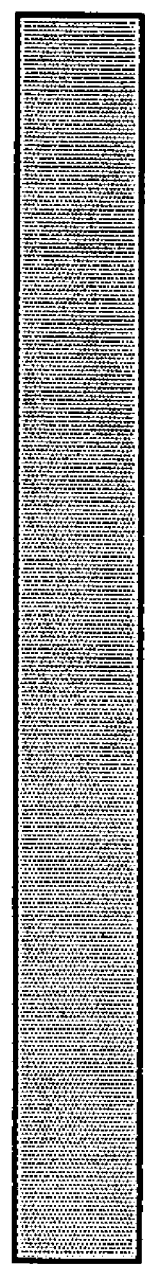
Figure 3:
Figure 3:
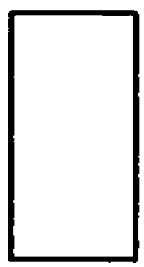

An example of the structure of coded data when MPEG-4 FGS coding is used as layered coding is shown in FIG. 3. That is to say, video coding section 104 generates, for an input image, coded data composed of a base layer (BL), enhancement layer 1 (EL1) that improves image quality, and enhancement layer 2 (EL2), enhancement layer 3 (EL3), and enhancement layer 4 (EL4) that improve smoothness of motion, and outputs this coded data to channel division section 106.

In this case, image quality can be improved by adding enhancement layer 1 to the base layer, and motion can become much smoother by adding data to the base layer in the order: enhancement layer 2, enhancement layer 3, enhancement layer 4. Furthermore, for enhancement layers, data can be divided into a plurality from a lower layer (the start of a video stream), and the degree of quality to which improvement is made can be controlled by controlling the amount of data added to the base layer.

Figure 4:
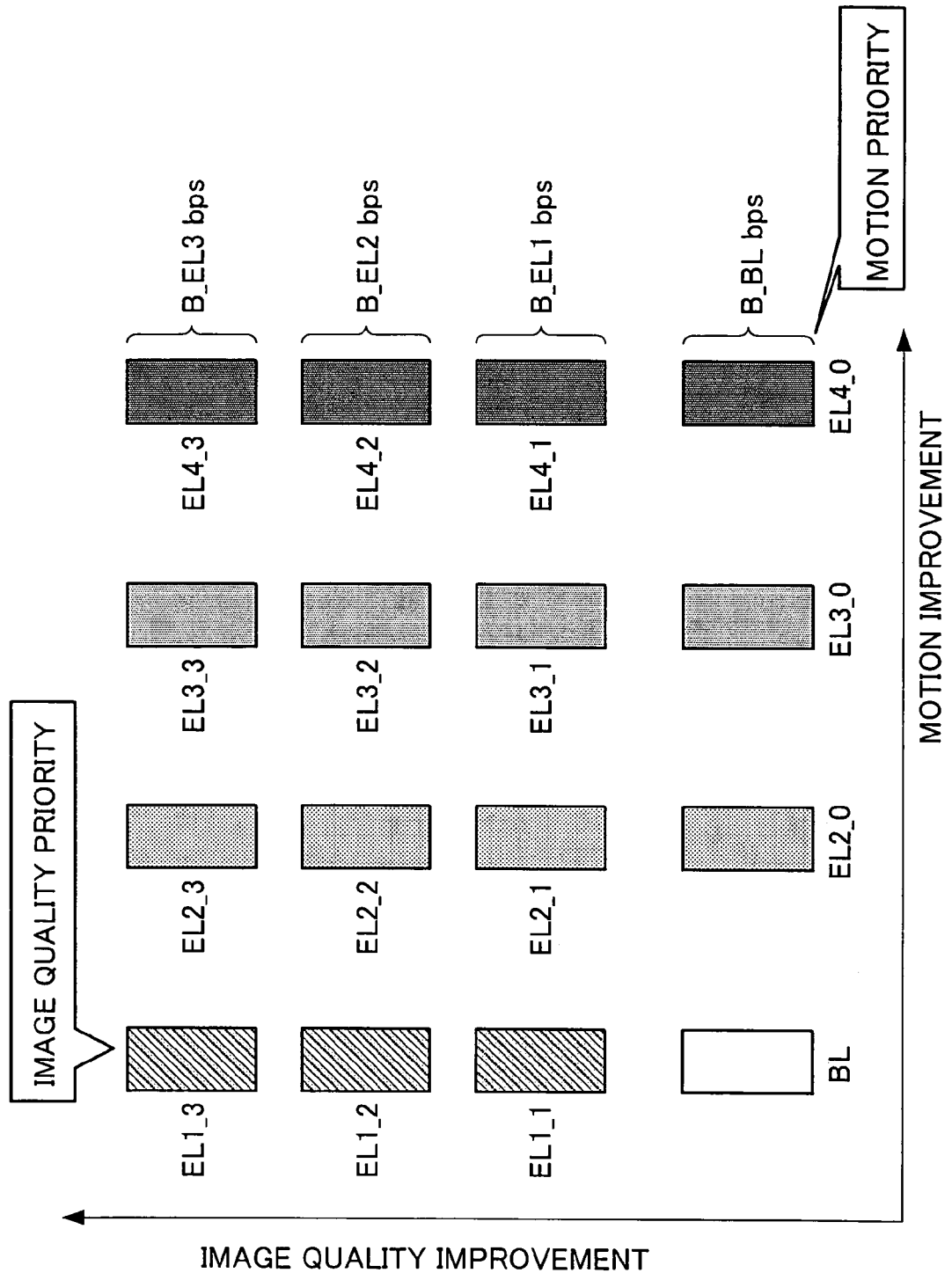
FIG. 4 is a drawing showing an example of the result of channel division for the coded data in FIG. 3.

Channel division section 106 divides coded data output from video coding section 104 into a plurality, assigns a separate channel to each of the divided data and adds a priority output from priority calculation section 112, and outputs the divided data to video transmitting section 108. Channel division section 106 also generates a division list, which is a list of divided data and assigned channels, and outputs this division list to group list calculation section 114. An example of the result of channel division is shown in FIG. 4. Details of the processing will be given later herein.

Video transmitting section 108 transmits the divided data output from channel division section 106 to network 180 on the corresponding separate channels. Specifically, for example, coded data divided and assigned to separate channels are multicast-transmitted to network 180 on separate channels with a specified priority added to the header. A priority can be written in an IP (Internet Protocol) header, for example. A channel is assumed to be indicated by a multicast address, for example. Here, multicast transmission is a method whereby data is transmitted from one transmitting terminal to a plurality of terminals simultaneously, and whereby data transfer is performed only to a terminal specified for reception of a multicast address which is that of the transmit data channel. As there is no duplication in data transmitted within the same transmission path even when a plurality of receiving terminals perform reception at the same time, multicast transmission offers good transmission efficiency.

The video stream transmission method is not, of course, limited to multicast transmission.

Terminal information receiving section 110 receives terminal information transmitted from a receiving terminal (video receiving apparatus 150), and outputs this information to priority calculation section 112. Here, terminal information may be of any kind as long as it is information relating to a receiving terminal and can indicate quality to be given priority. Items that could be used as terminal information include the screen size of a display device used by a receiving terminal, the terminal processing capability, or the error rate of the network to which the terminal is connected.

Priority calculation section 112 calculates the priority of each channel using terminal information output from terminal information receiving section 110, and outputs the calculated priorities to channel division section 106. Details of the processing will be given later herein.

Using a division list output from channel division section 106, group list calculation section 114 generates a group list, which is a list of priority qualities and channels to be received, and outputs this group list to group list transmitting section 116. Details of the processing will be given later herein.

Group list transmitting section 116 transmits the group list output from group list calculation section 114 to network 180. Specifically, for example, the group list is transmitted to all receiving terminals via network 180.

In this embodiment, a description is given taking the case in which group list transmission is always performed as an example, but this is not a limitation. For example, transmission at fixed intervals is also possible in order to avoid transmission path congestion.

Network 180 has nodes (network nodes) (not shown) A network node performs data transmission (packet transmission) in accordance with the priority added to a channel. Specifically, when the network is congested, data is discarded from low-priority channels, and high-priority channel data transmission is guaranteed. Also, only data of a channel selected by video receiving apparatus 150 from among the plurality of channels transmitted from video transmitting apparatus 100 is transferred to that receiving terminal 150. A network node may be a router, for example.

Video receiving apparatus 150 has a terminal information transmitting section 152, priority quality input section 154, group list receiving section 156, reception channel determination section 158, video receiving section 160, video decoding section 162, and video display section 164.

Terminal information transmitting section 152 transmits terminal information of the relevant video receiving apparatus 150 to video transmitting apparatus 100. For example, the display screen size may be transmitted as terminal information. As described above, terminal information may be of any kind as long as it is information relating to a receiving terminal and can indicate quality to be given priority.

In this embodiment, a description is given taking the case where terminal information is transmitted each time video data is received as an example, but this is not a limitation. For example, transmission at fixed intervals is also possible in order to avoid transmission path congestion.

Priority quality input section 154 outputs quality to be given priority (such as image quality priority or motion priority, for example) specified by the user to reception channel determination section 158. If there is no specification by the user, priority quality output is not performed.

Group list receiving section 156 receives a group list (a list showing qualities and channels, as described above) transmitted from the transmitting terminal (video transmitting apparatus 100), and outputs this group list to reception channel determination section 158.

Using the priority quality output from priority quality input section 154 and the group list output from group list receiving section 156, reception channel determination section 158 determines channels to be received. Specifically, reception channel determination section 158 determines the number of a channel to be received and outputs the determined channel number to video receiving section 160. If there is no output from priority quality input section 154 or group list receiving section 156, the channel numbers determined the previous time are output to video receiving section 160. Details of the processing will be given later herein.

Video receiving section 160 receives coded data corresponding to a channel number output from reception channel determination section 158, and outputs the received coded data to video decoding section 162.

Video decoding section 162 decodes the coded data output from video receiving section 160, and outputs the video obtained by decoding to video display section 164.

Video display section 164 displays the video output from video decoding section 162 on a screen. Video display section 164 comprises a display device.

Figure 5:
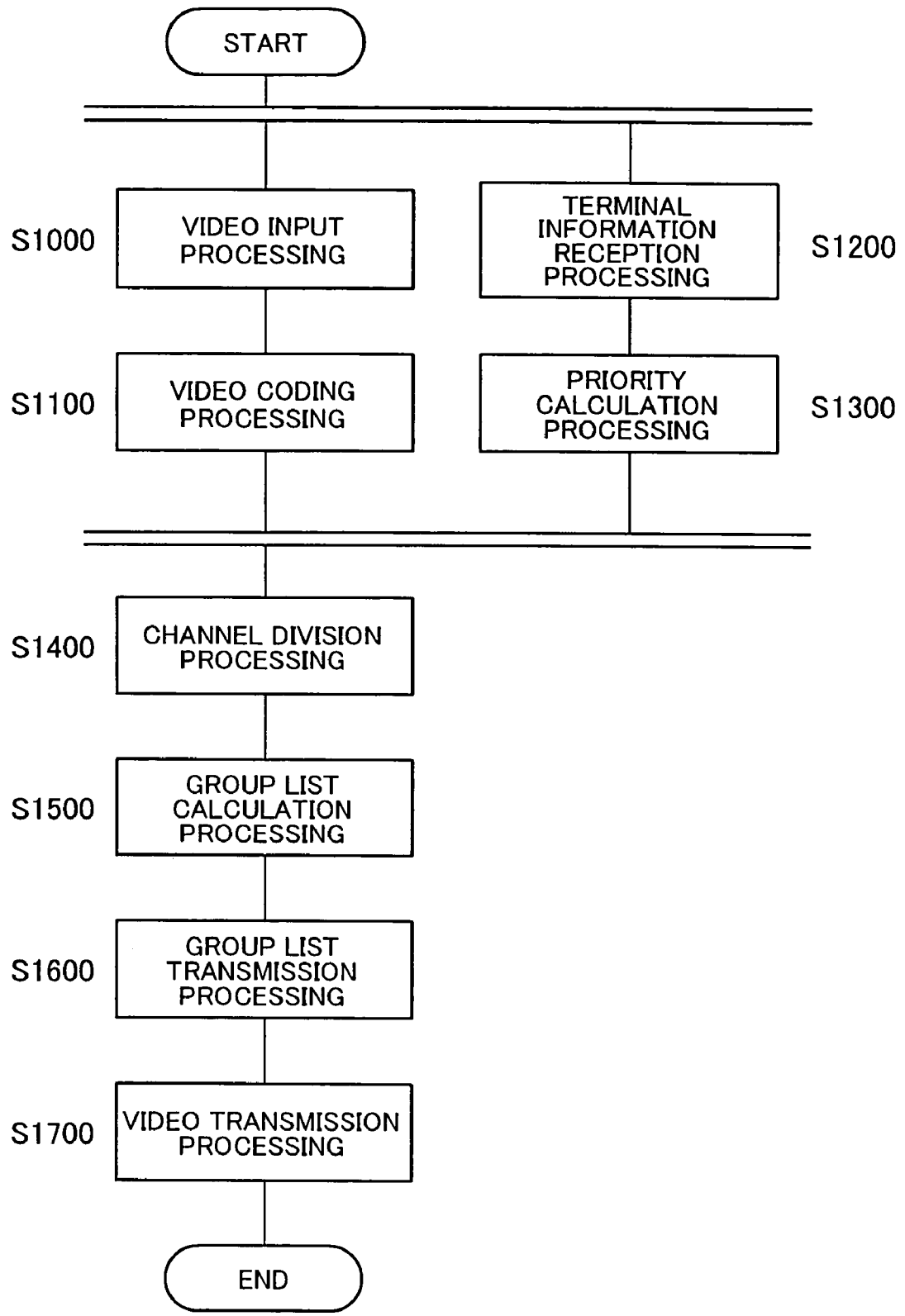
FIG. 5 is a flowchart showing the operation of a video transmitting apparatus corresponding to Embodiment 1.

The operation of video transmitting apparatus 100 that has the above configuration will now be described using the flowchart shown in FIG. 5. The flowchart shown in FIG. 5 is stored as a control program in a storage device (such as ROM or flash memory, for example) of video transmitting apparatus 100 not shown in the figure, and executed by a CPU (also not shown).

First, instep S1000, video input section 102 outputs images making up video to video coding section 104 on a frame-by-frame basis.

Then, in step S1100, video coding section 104 performs layered coding on an image output from video input section 102, and outputs the obtained coded data to channel division section 106. For example, when MPEG-4 FGS coding is used as layered coding, coded data is composed of a base layer (BL) and a plurality of enhancement layers (EL). Here, as an example, a case is described in which coded data is composed of one base layer (BL) and four enhancement layers (EL1 through EL4).

In step S1200, meanwhile, terminal information receiving section 110 receives terminal information transmitted from a plurality of video receiving apparatuses 150, and outputs this terminal information to priority calculation section 112. Here, as an example, terminal information is assumed to be the screen size (D inches) of the display device used by a video receiving apparatus 150.

However, as stated above, terminal information is not limited to screen size, and any information can be used that is capable of indicating quality to be given priority according to the user's preference (motion priority, image quality priority) or the like.

Then, in step S1300, priority calculation section 112 determines the priority of each channel using terminal information output from terminal information receiving section 110, and outputs the determined priorities to channel division section 106. That is to say, when terminal information is received, priority is determined using the received terminal information, and the determined priority is output to channel division section 106. If terminal information is not received, on the other hand, the previous priority is output to channel division section 106.

Specifically, the quality to be emphasized is determined using a plurality of terminal information D_n (where n is the terminal number), and the priority of each channel is determined based on this quality to be emphasized. The procedure is as follows.

1) Average Screen Size Calculation

Using plurality of terminal information D_n, average screen size D_AVR is calculated by means of Equation (1) below.

$$D\_AVR = \frac{1}{N}\sum_{n=1}^{N} D\_n \quad \text{Equation (1)}$$

Here, N is the total number of terminals.

2) Determination of Quality to be Emphasized

Average screen size D_AVR is compared with a threshold value TH, and the quality to be emphasized is determined. Here, since a higher frame-by-frame image quality is desirable the larger the terminal display screen size, image quality is emphasized. Specifically, for example, when average screen size D_AVR exceeds threshold value TH (D_AVR>TH), image quality is emphasized, and when this is not the case—that is, when average screen size D_AVR is less than or equal to threshold value TH (D_AVR≦TH)—motion is emphasized.

3) Priority Determination

Figure 6B:
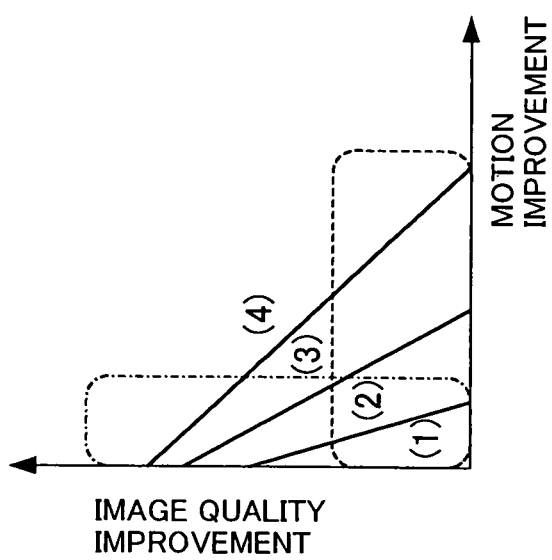
FIG. 6B is a drawing for explaining priority assignment in the case of motion emphasis.
Figure 6C:
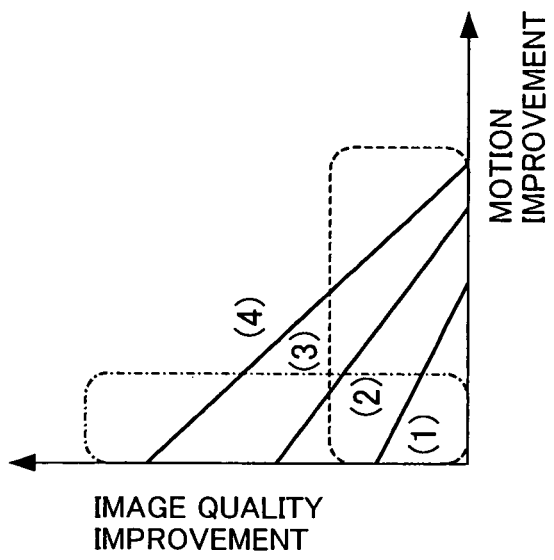
FIG. 6C is a drawing for explaining priority assignment in the case of image quality emphasis.
Figure 6A:
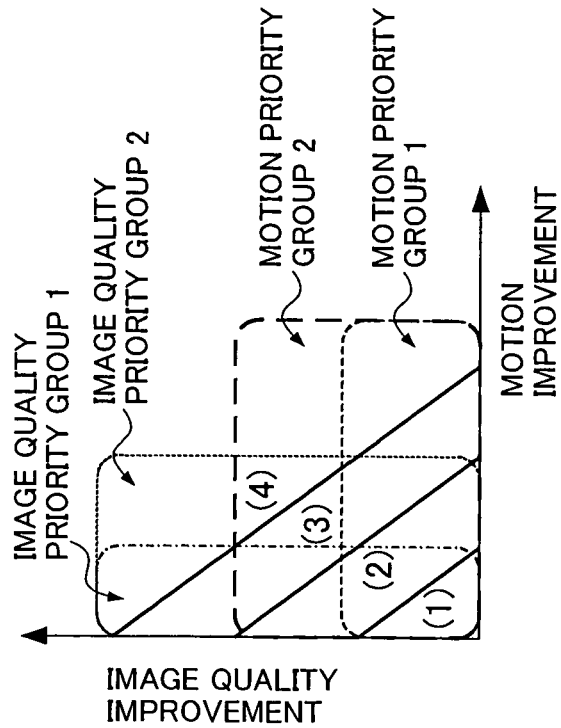
FIG. 6A is a drawing for explaining priority assignment and grouping.

The priority of each channel is determined based on the quality to be emphasized. Specifically, in the case of motion emphasis, channel priority is raised in the direction of motion improvement (time scalability) (see FIG. 6A and FIG. 6B), and in the case of image quality emphasis, channel priority is raised in the direction of image quality improvement (image quality scalability) (see FIG. 6A and FIG. 6C).

Figure 7B:
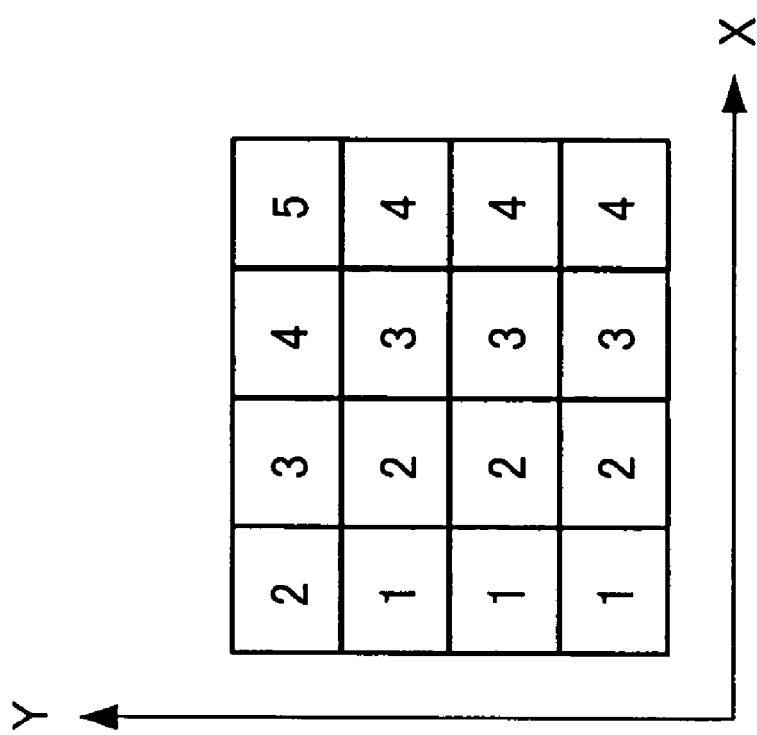
FIG. 7B is a drawing showing a priority map in the case of image quality emphasis.
Figure 7A:
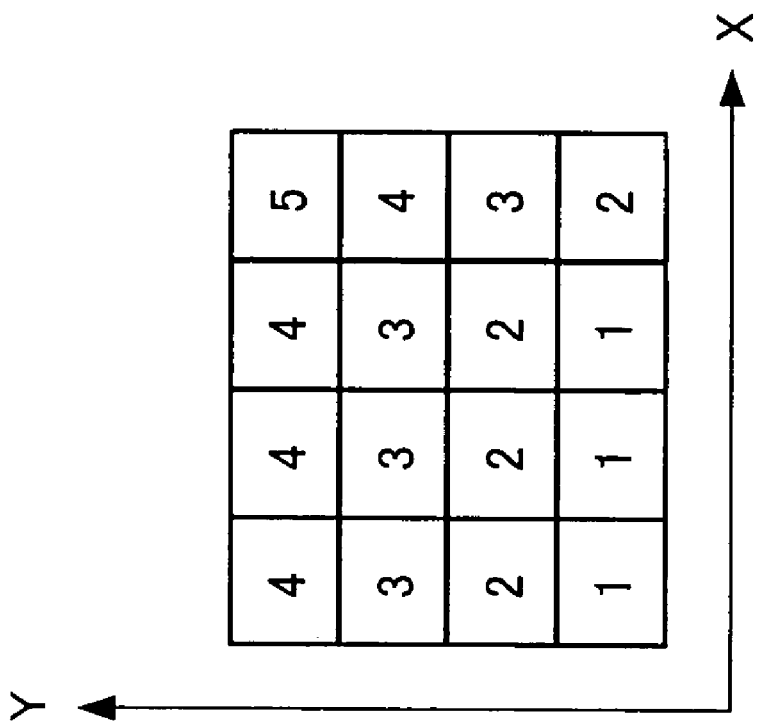
FIG. 7A is a drawing showing a priority map in the case of motion emphasis.

To explain this using the priority map (map showing channels and priorities) in FIG. 7, in the case of motion emphasis, priority is raised in the X direction of the priority map, and, conversely, in the case of image quality emphasis, priority is raised in the Y direction of the priority map. For example, in the case of motion emphasis, priorities are set as shown in FIG. 7A, and in the case of image quality emphasis, priorities are set as shown in FIG. 7B. The priority map will be further explained later herein. The method used for the priority map is not limited to that shown in FIG. 7. In FIG. 7, the lower the number, the higher is the priority represented.

By determining priority in line with terminal information in this way, it is possible to transmit at high priority for a type of quality appropriate to terminal characteristics in any bit rate.

Then, in step S1400, channel division section 106 divides coded data output from video coding section 104 into a plurality, assigns separate channels to the respective divided data and also adds a priority output from priority calculation section 112, and outputs the data to video transmitting section 108.

Specifically, to take the example of coded data with the structure shown in FIG. 3, first of all, the base layer (BL) is made one channel, and enhancement layers (EL) 1 through 4 are divided based on predetermined data amounts and made separate channels.

For example, in the case of division into four, enhancement layer 1 is divided into EL1_1 through EL1_3, enhancement layer 2 into EL2_0 through EL2_3, enhancement layer 3 into EL3_0 through EL3_3, and enhancement layer 4 into EL4_0 through EL4_3, for overall division into 4×N (see the channel division example in FIG. 4; in this case, N=4), so that the bit rates of the channels become set bit rates B_BL, B_EL1, B_EL2, and B_EL3. Of course, the number of divisions is not limited to four.

Figures 8A, 8B:
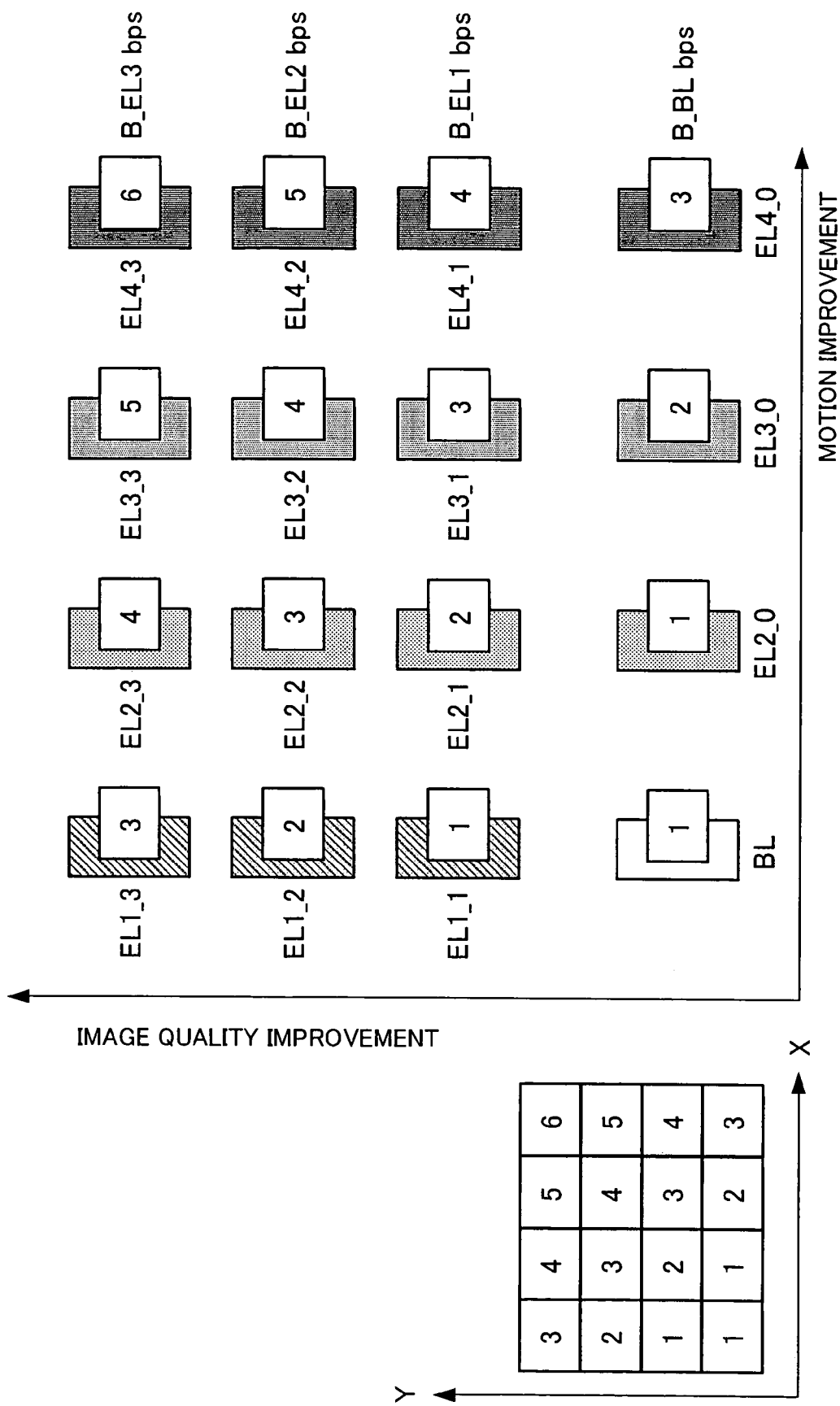
FIG. 8A is a drawing showing an example of a priority map.
FIG. 8B is a drawing showing channels after priority assignment based on the above priority map.

Next, the priorities output from priority calculation section 112 are assigned to the channels. For example, FIG. 8A shows a priority map, and this priority map comprises a 4×4 matrix. In this priority map, bottom-left (X,Y)=(0,0) indicates the priority of base layer BL, the priorities of enhancement layers EL2_0 through EL4_0 are indicated in that order moving away from base layer BL in the X direction, and the priorities of enhancement layers EL1_1 through EL1_3 are indicated in that order moving away from base layer BL in the Y direction. Generally, (X,Y)=(I,J) indicates the priority of EL(I+1)_J. The channels after priority assignment obtained by applying the channel division results in FIG. 4 to the priority map in FIG. 8A are as shown in FIG. 8B.

Then, in step S1500, using the division list output from channel division section 106, group list calculation section 114 generates a group list showing channels to be received classified by quality to be given priority, and outputs this group list to group list transmitting section 116.

FIG. 9 shows group list examples. In these examples, a case in which three groups (motion preference, image quality preference, and full quality) are calculated is shown. Group lists are not, of course, limited to three. Any kind of group is possible as long as it is one channel or a combination of two or more channels. For example, a plurality of groups of different degrees may be provided for the same type of quality (see, for example, motion preference groups 1 and 2, and image quality preference groups 1 and 2, in FIG. 6A). That is to say, groups of different types of quality and degrees can be set arbitrarily.

In the examples in FIG. 9, (X,Y)=(0,0) corresponds to base layer BL, (X,Y)=(I,J) corresponds to EL(I+1)_J, and a channel marked with a circle (○) indicates a channel that should be received in that group. That is to say, in the case of a motion preference group a list is generated whereby a channel of an enhancement layer that improves motion is received preferentially, in the case of an image quality preference group a list is generated whereby a channel of an enhancement layer that improves image quality is received preferentially, and in the case of a full quality group a list is generated whereby all channels are received. By generating a group list in this way, it is possible for a receiving terminal to receive channels in line with quality given priority, and receive optimal images at the selected quality.

Then, in step S1600, group list transmitting section 116 transmits a group list output from group list calculation section 114 to network 180. Specifically, the group list is transmitted to all receiving terminals via network 180. In this embodiment, it is assumed that group list transmission is always performed, but this is not a limitation, and, as stated above, transmission at fixed intervals is also possible in order to avoid transmission path congestion, for example.

Next, in step S1700, video transmitting section 108 transmits divided data output from channel division section 106 to network 180 on the respective corresponding channels. Specifically, for example, as described above, coded data divided and assigned to separate channels are multicast-transmitted to network 180 on separate channels with a specified priority added to the header. At this time, a channel is indicated by a multicast address, for example.

Figure 10:
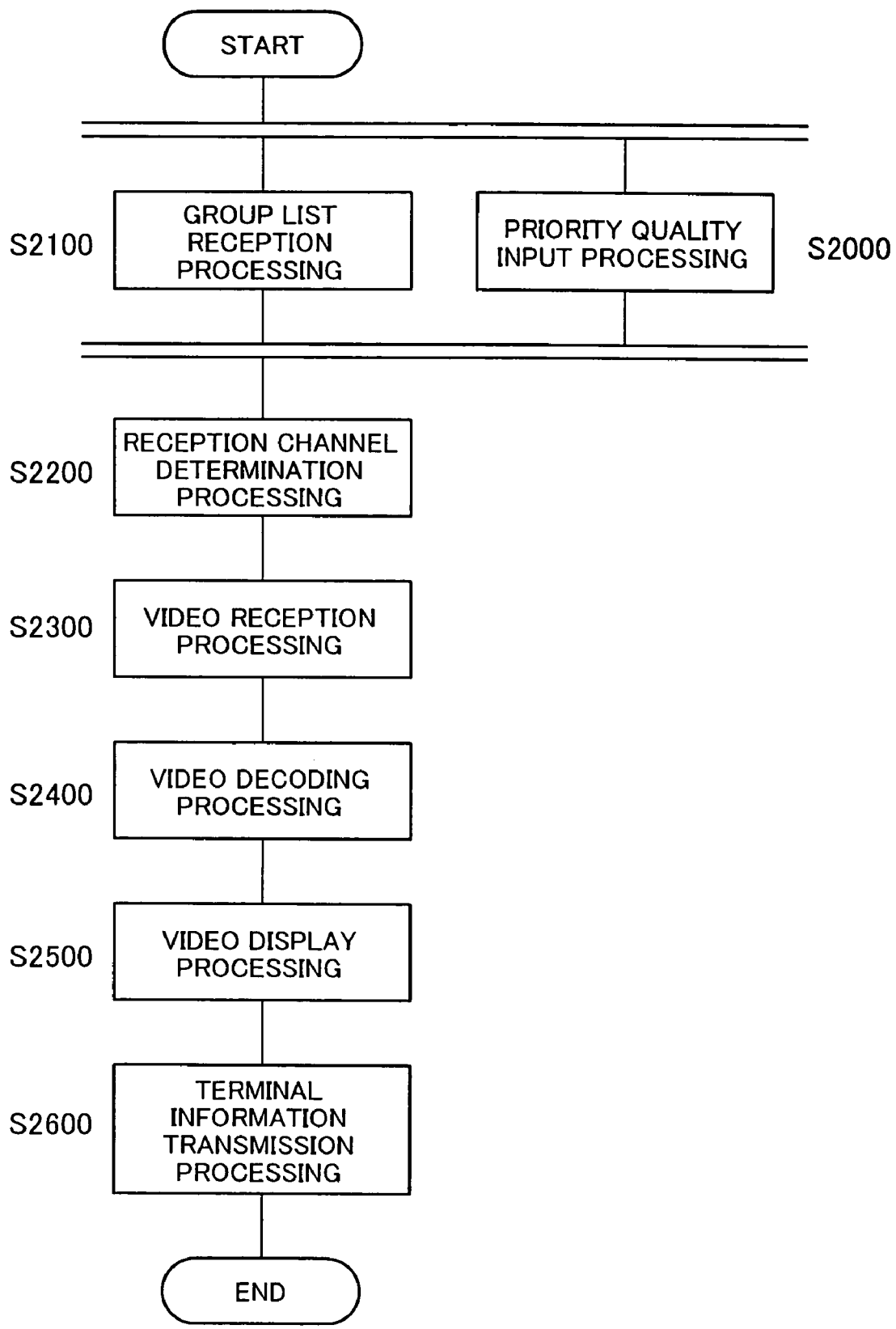
FIG. 10 is a flowchart showing the operation of a video receiving apparatus corresponding to Embodiment 1.

The operation of video receiving apparatus 150 that has the above configuration will now be described using the flowchart shown in FIG. 10. The flowchart shown in FIG. 10 is stored as a control program in a storage device (such as ROM or flash memory, for example) in video receiving apparatus 150 not shown in the figure, and executed by a CPU (also not shown).

First, instep S2000, priority quality input section 154 outputs quality to be given priority specified by the user to reception channel determination section 158. Here, it is assumed that one of three types—motion preference, image quality preference, or full quality—is selected, for example (see FIG. 9). As described above, if there is no specification by the user, priority quality output is not performed.

In step S2100, meanwhile, group list receiving section 156 receives a group list transmitted from video transmitting apparatus 100, and outputs this group list to reception channel determination section 158.

In step S2200, using the priority quality output from priority quality input section 154 and the group list output from group list receiving section 156, reception channel determination section 158 determines channels to be received.

Figure 9C:
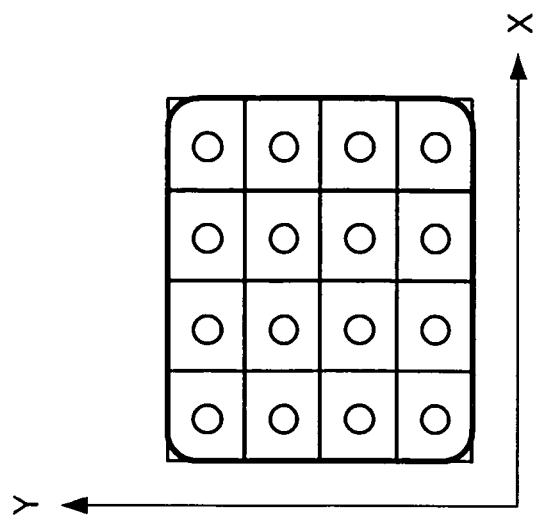
FIG. 9C is a drawing showing a full quality group within a group list.
Figure 9B:
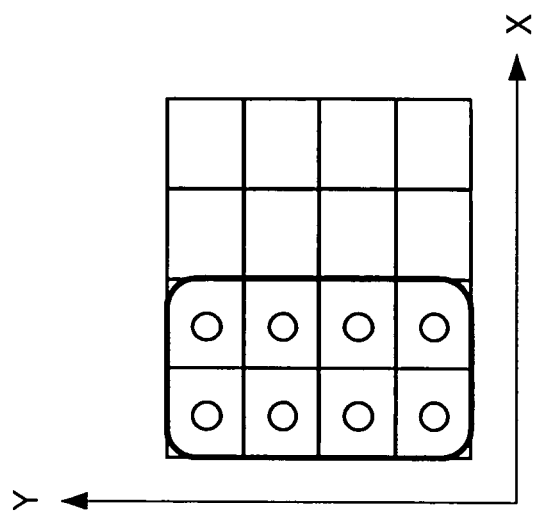
FIG. 9B is a drawing showing an image quality priority group within a group list.
Figure 9A:
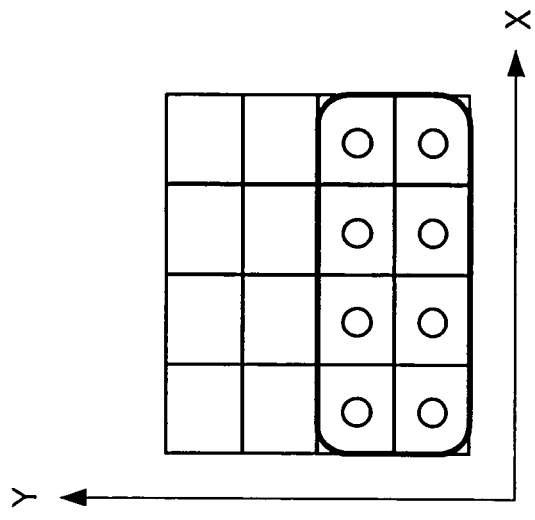
FIG. 9A is a drawing showing a motion priority group within a group list.

Consider the case in which a group list in FIG. 9 is received, for example. In this case, when the priority quality is motion priority, it is determined that the channels marked with a circle (○) shown in FIG. 9A are to be received; when the priority quality is image quality priority, it is determined that the channels marked with a circle (○) shown in FIG. 9B are to be received; and when the priority quality is full quality, it is determined that the channels marked with a circle (○) shown in FIG. 9C are to be received.

If there is no output from priority quality input section 154 or group list receiving section 156, the channel numbers determined the previous time are output to video receiving section 160.

Then, in step S2300, video receiving section 160 performs coded data reception for channel numbers output from reception channel determination section 158, and outputs the received coded data to video decoding section 162.

In step S2400, video decoding section 162 decodes coded data output from video receiving section 160, and outputs the obtained video to video display section 164.

In step S2500, video display section 164 displays video output from video decoding section 162 on a screen.

Then, in step S2600, terminal information transmitting section 152 transmits terminal information of the relevant video receiving apparatus 150 to video transmitting apparatus 100. For example, as stated above, the screen size (D inches) of the display device may be transmitted as terminal information. In this embodiment, it has been assumed that terminal information is transmitted each time video data is received, but this is not a limitation, and, for example, as stated above, transmission at fixed intervals is also possible in order to avoid transmission path congestion.

Figure 11:
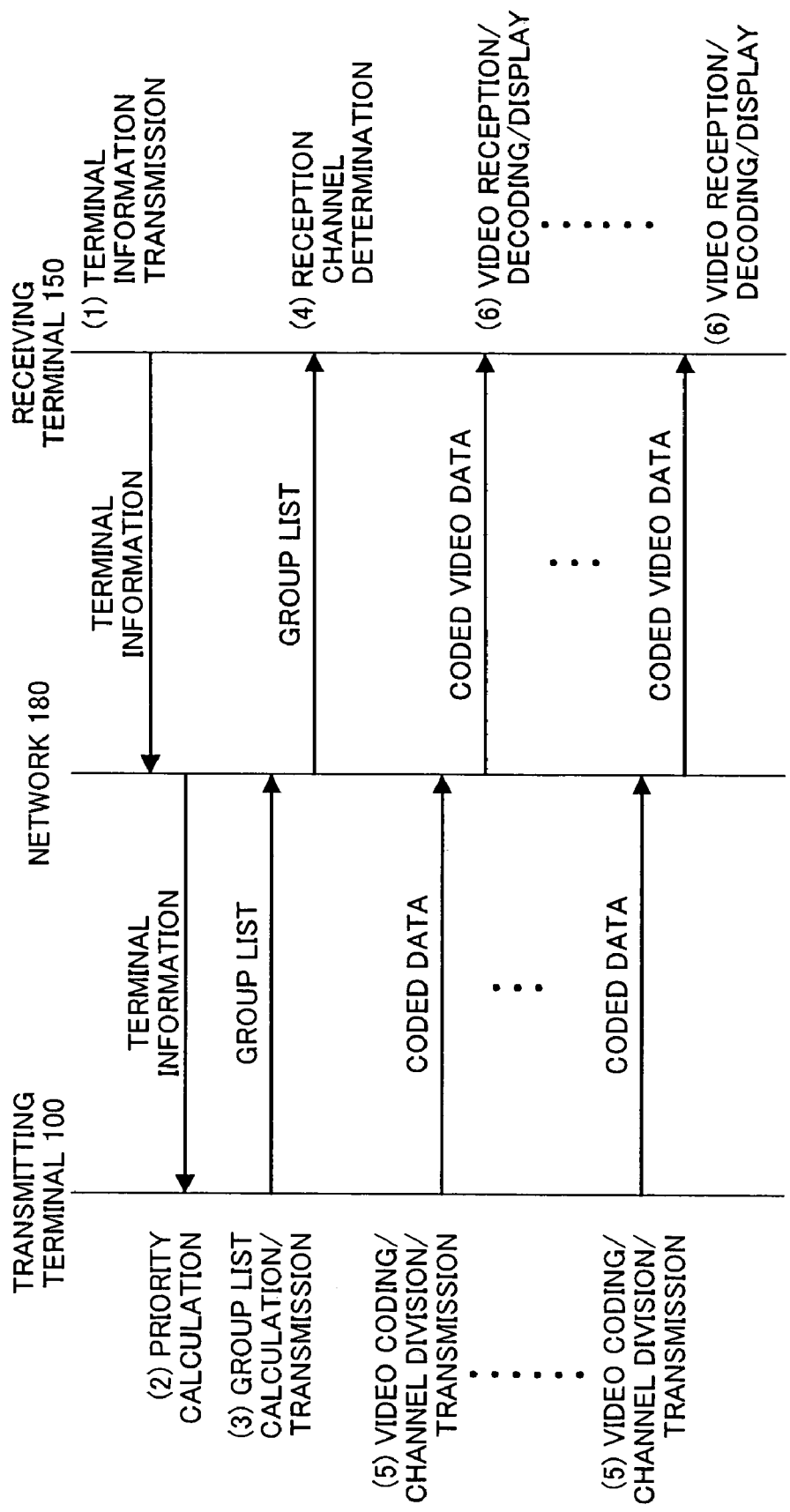
FIG. 11 is a sequence diagram showing the main information exchanges in a video transmission system corresponding to Embodiment 1.

The main information exchanges in a video transmission system with the above configuration will now be described using the sequence diagram in FIG. 11.

First, video receiving apparatus 150 transmits terminal information (for example, display screen size) to video transmitting apparatus 100 via network 180 ((1)).

On receiving the terminal information from video receiving apparatus 150, video transmitting apparatus 100 performs channel priority calculation using the received terminal information ((2)), then calculates a group list, and transmits the calculated group list to video receiving apparatus 150 via network 180 ((3)).

On receiving the group list from video transmitting apparatus 100, video receiving apparatus 150 performs reception channel determination using the received video list ((4)).

Transmitting terminal 100 then performs video coding and channel division (including priority assignment) on the input video on a frame-by-frame basis, and transmits coded data after division and priority assignment to receiving terminal 150 via network 180 on separate channels ((5)). At this time, network 180 performs data transmission (packet transmission) according to priority.

Receiving terminal 150 then receives coded video data from transmitting terminal 100 on the above reception channels, decodes the data, and displays it on a screen ((6)).

Figure 12:
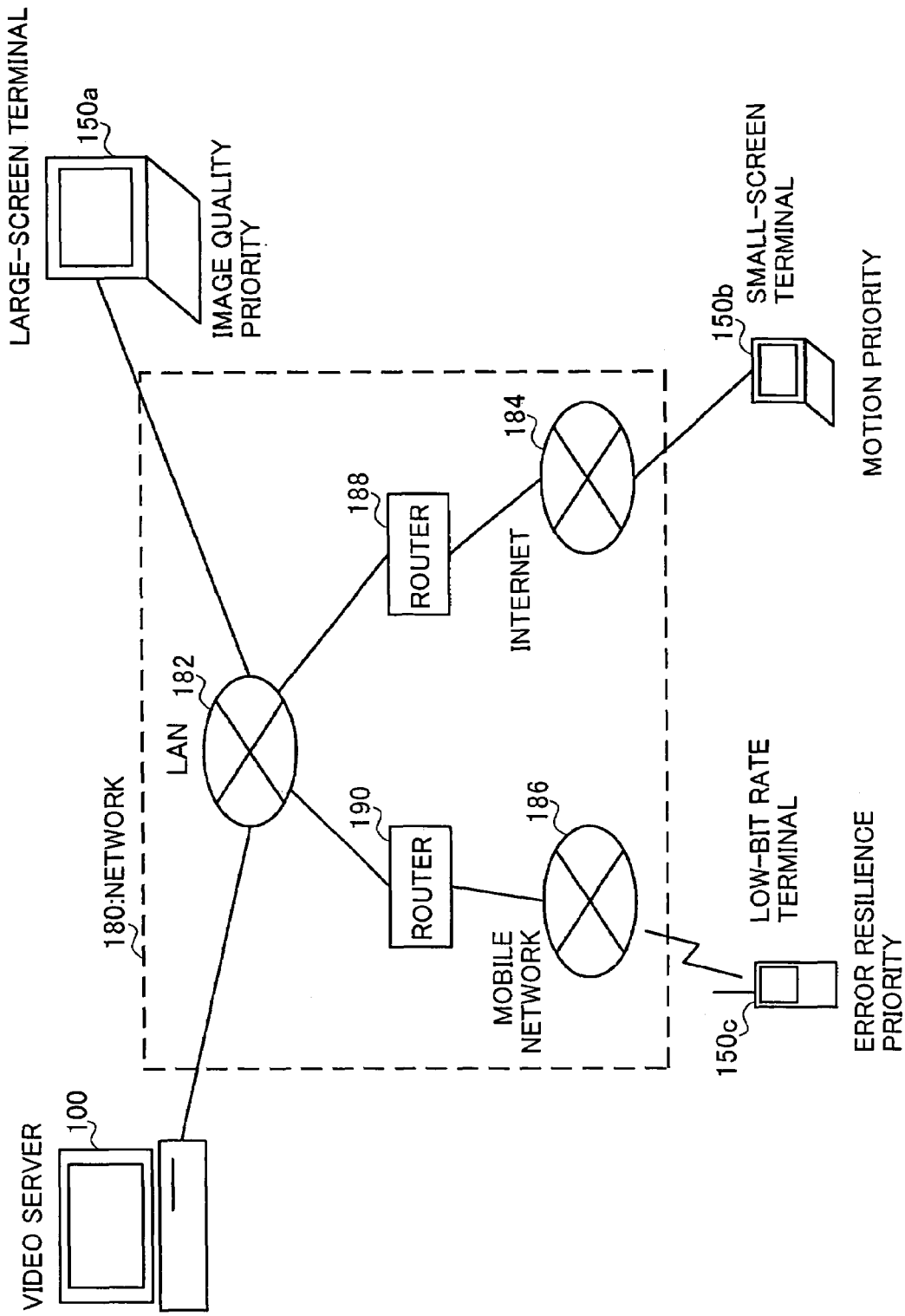
FIG. 12 is a drawing showing an application example of a video transmission system of Embodiment 1.

FIG. 12 is a drawing showing an application example of a video transmission system of this embodiment. In FIG. 12, a video server 100 is provided as a video transmitting apparatus, and a large-screen terminal 150a, small-screen terminal 150b, and low-bit rate terminal 150c are provided as video receiving apparatuses. Video server 100 and terminals 150a through 150c are interconnected via network 180. Network 180 includes a LAN 182, Internet 184, and mobile network 186, with LAN 182 and Internet 184 interconnected via a router 188, and LAN 182 and mobile network 186 interconnected via a router 190. That is to say, video server 100 and large-screen terminal 150a are connected via LAN 182, video server 100 and large-screen terminal 150a are connected via LAN 182, video server 100 and small-screen terminal 150b are connected via LAN 182, router 188, and Internet 184, and video server 100 and low-bit rate terminal 150c are connected via LAN 182, router 190, and mobile network 186.

In this case, large-screen terminal 150a can receive video with image quality given priority, small-screen terminal 150b can receive video with motion given priority, and low-bit rate terminal 150c can receive video with error resilience given priority.

Thus, according to this embodiment, layered-coded data is divided into separate channels by quality and bit rate, and group lists classified by quality are transmitted, enabling a plurality of receiving terminals to freely select the quality to be given priority, respectively, and receive video accordingly.

Also, since the priority of each channel is calculated based on terminal information, and transmission is performed with priorities attached, in a transmission bit rate usable by terminals, each terminal can select and receive a group of the quality to be given priority, and automatically receive video of optimal quality appropriate to the characteristics of that terminal. Furthermore, it is possible to achieve video transmission of a quality in accordance with terminal characteristics.

Embodiment 2

In this embodiment, a video transmission system is described whereby, by performing channel division of layered-coded data by quality and bit rate and transmitting data on separate channels after adding a priority calculated using input video information, and also transmitting a group list classified by quality, a receiving terminal can select quality to be given priority, and can receive video with quality that accords with network conditions and is appropriate to terminal characteristics.

Figure 13:
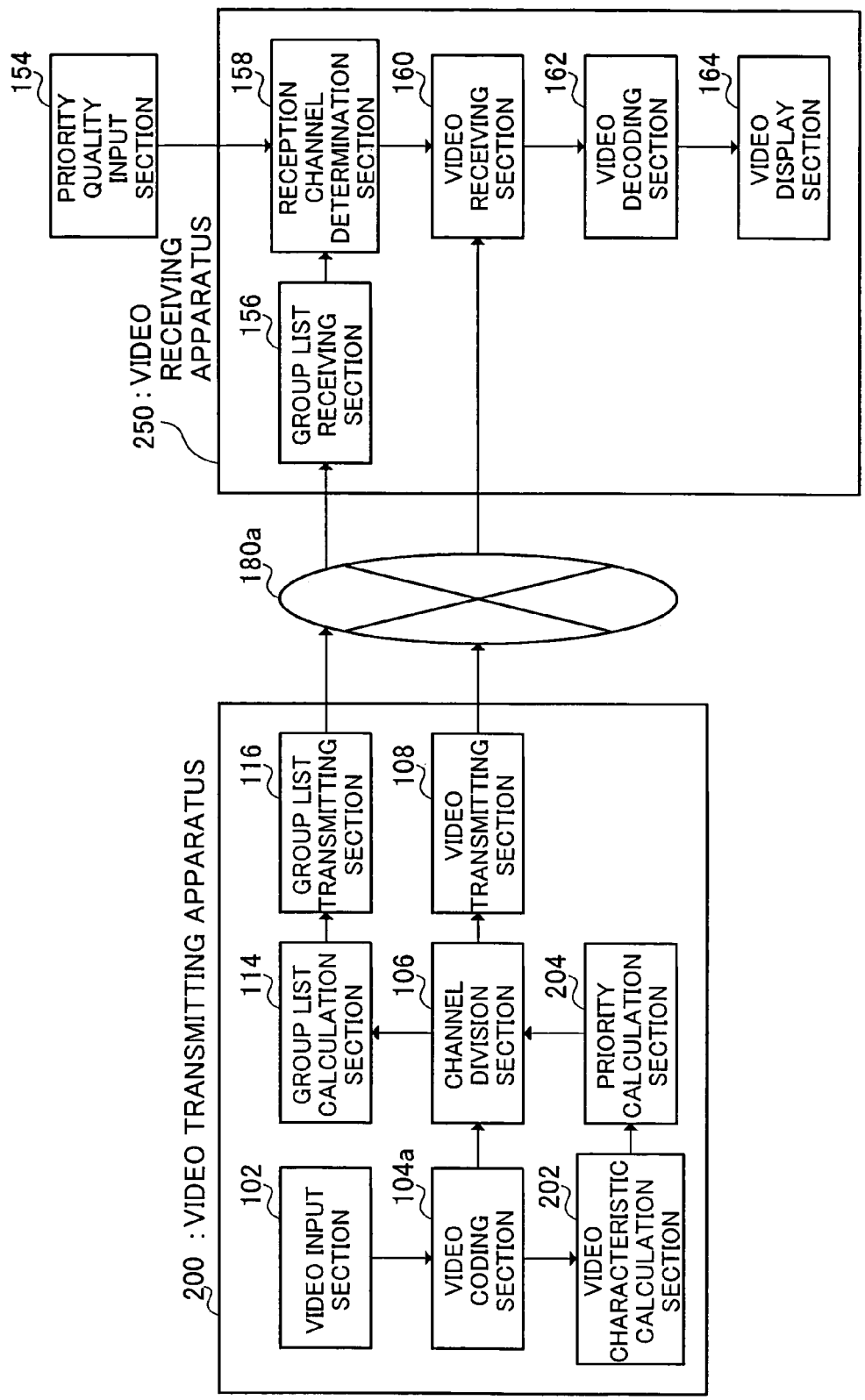
FIG. 13 is a drawing showing the configuration of a video transmission system according to Embodiment 2 of the present invention.

FIG. 13 is a drawing showing the configuration of a video transmission system according to Embodiment 2 of the present invention. A video transmitting apparatus 200 and video receiving apparatus 250 in this video transmission system have similar basic configurations to those of video transmitting apparatus 100 and video receiving apparatus 150 respectively in the video transmission system shown in FIG. 2, and therefore identical configuration components are assigned the same codes as in FIG. 2, and a description thereof is omitted.

A feature of this embodiment is that, whereas in Embodiment 1 channel priority is calculated based on terminal information, here, channel priority is calculated based on video characteristics. For this reason, video transmitting apparatus 200 has a video coding section 104a, video characteristic calculation section 202, and priority calculation section 204, and video receiving apparatus 250 does not have the terminal information transmitting section 152 shown in FIG. 2.

In the same way as video coding section 104 in FIG. 2, video coding section 104a performs layered coding, with an image output from video input section 102 as an input image, and outputs the obtained coded data to channel division section 106. For example, when MPEG-4 FGS coding is used as layered coding, video coding section 104a generates and outputs, for an input image, coded data composed of a base layer (BL), enhancement layer 1 (EL1) that improves image quality, and enhancement layer 2 (EL2) enhancement layer 3 (EL3), and enhancement layer 4 (EL4) that improve smoothness of motion (see FIG. 3). However, in this embodiment, video coding section 104a also outputs the base layer (BL) to video characteristic calculation section 202.

Video characteristic calculation section 202 extracts motion vectors from the base layer (BL) output from video coding section 104a and calculates an input-video video characteristic, and outputs the obtained video characteristic value to priority calculation section 204. Details of the processing will be given later herein.

Priority calculation section 203 calculates the priority of each channel using the video characteristic value output from video characteristic calculation section 202, and outputs the calculated priorities to channel division section 106.

The operation of video transmitting apparatus 200 that has the above configuration will now be described using the flowchart shown in FIG. 14. The flowchart shown in FIG. 14 is stored as a control program in a storage device (such as ROM or flash memory, for example) of video transmitting apparatus 200 not shown in the figure, and executed by a CPU (also not shown).

Figure 14:
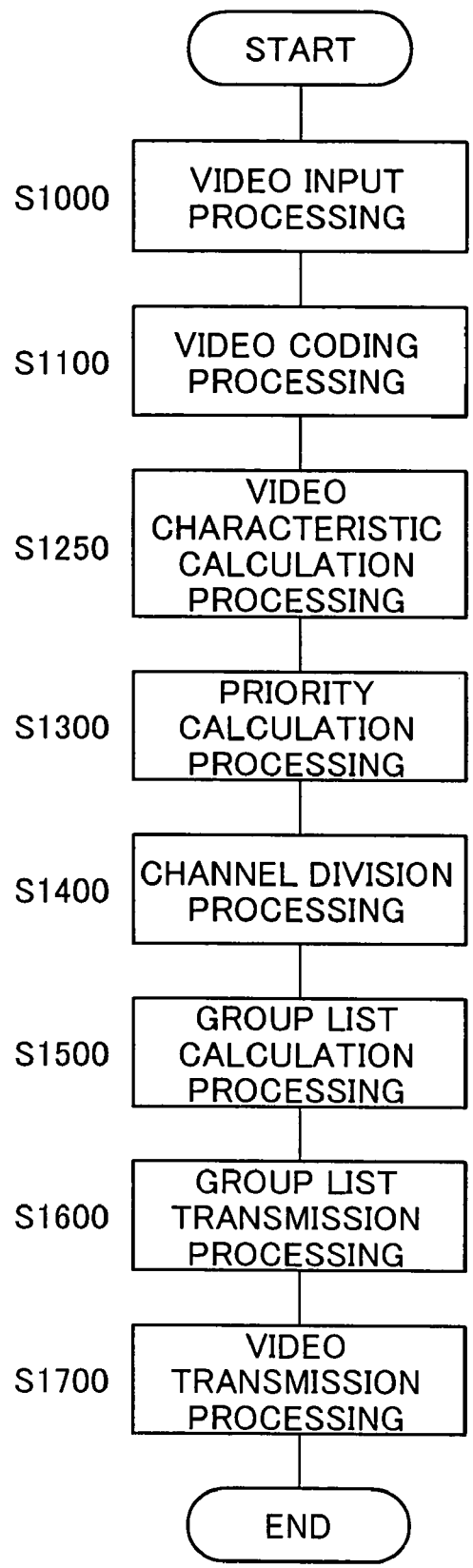
FIG. 14 is a flowchart showing the operation of a video transmitting apparatus corresponding to Embodiment 2.

In this embodiment, as shown in FIG. 14, a step S1250 is inserted in the flowchart shown in FIG. 5, and step S1200 is deleted therefrom.

Step S1000 and step S1100 are the same as the corresponding steps in the flowchart shown in FIG. 5, and therefore a description thereof is omitted. However, in this embodiment, at the time of video coding processing in step S1100, video coding section 104a outputs base layer (BL) coded data to video characteristic calculation section 202.

Then, in step S1250, video characteristic calculation section 202 extracts motion vectors from the base layer (BL) output from video coding section 104a and calculates an input-video video characteristic, and outputs the obtained video characteristic value to priority calculation section 204. Specifically, for example, motion vectors are extracted using base layer coded data output from video coding section 104a, the absolute sum of the extracted motion vectors is calculated, and the calculated absolute sum is taken as video characteristic value M.

Here, the larger the value of M, the greater is the motion of the video, and conversely, the smaller the value of M, the smaller is the motion of the video.

In this embodiment, a video characteristic value is the absolute sum of motion vectors, but this is not a limitation, and anything may be used that enables the magnitude of video motion to be indicated.

Then, in step S1300, priority calculation section 204 determines the priority of each channel using the video characteristic value output from video characteristic calculation section 202, and outputs a priority map to channel division section 106.

Specifically, the quality to be emphasized is first determined using a video characteristic, and the priority of each channel is determined based on this quality to be emphasized. The procedure is as follows.

1) Determination of Quality to be Emphasized

Video characteristic value M is compared with a threshold value TH, and the quality to be emphasized is determined. Here, since greater smoothness of motion is desirable the larger the video characteristic value—that is, the greater the motion of the video—motion is emphasized. Specifically, for example, when video characteristic value M exceeds threshold value TH (M>TH), motion quality is emphasized, and when this is not the case—that is, when video characteristic value M is less than or equal to threshold value TH (M≦TH)—image quality is emphasized.

2) Priority Determination

The priority of each channel is determined based on the quality to be emphasized. Specifically, as explained above, priority is raised in the X direction of the priority map in the case of motion emphasis, and conversely, priority is raised in the Y direction of the priority map in the case of image quality emphasis (see FIG. 7A and FIG. 7B). By determining priority in line with video characteristics in this way, it is possible to adapt to video characteristics and transmit at high priority for quality for keeping subjective image quality high in any bit rate.

Step S1400 through step S1700 are the same as the corresponding steps in the flowchart shown in FIG. 5, and therefore a description thereof is omitted.

Thus, according to this embodiment, layered-coded data is divided into separate channels by quality and bit rate, and group lists classified by quality are transmitted, enabling a plurality of receiving terminals to freely select the quality to be given priority, respectively, and receive video accordingly.

Also, since the priority of each channel is calculated based on video characteristics, and transmission is performed with priorities attached, in a transmission bit rate usable by each terminal, it is possible to receive with priority given to quality that has great influence on subjective image quality with respect to input video. That is to say, it is possible to achieve video transmission emphasizing appropriate quality in accordance with video characteristics.

Embodiment 3

In this embodiment, a video transmission system is described whereby, by dividing layered-coded data by quality and bit rate and transmitting data on separate channels after adding a priority calculated on a packet-by-packet basis within each channel, and also transmitting a group list classified by quality, a receiving terminal can select quality to be given priority, and can receive video with quality that accords with network conditions with finer precision and is appropriate to terminal characteristics and video characteristics.

Figure 15:
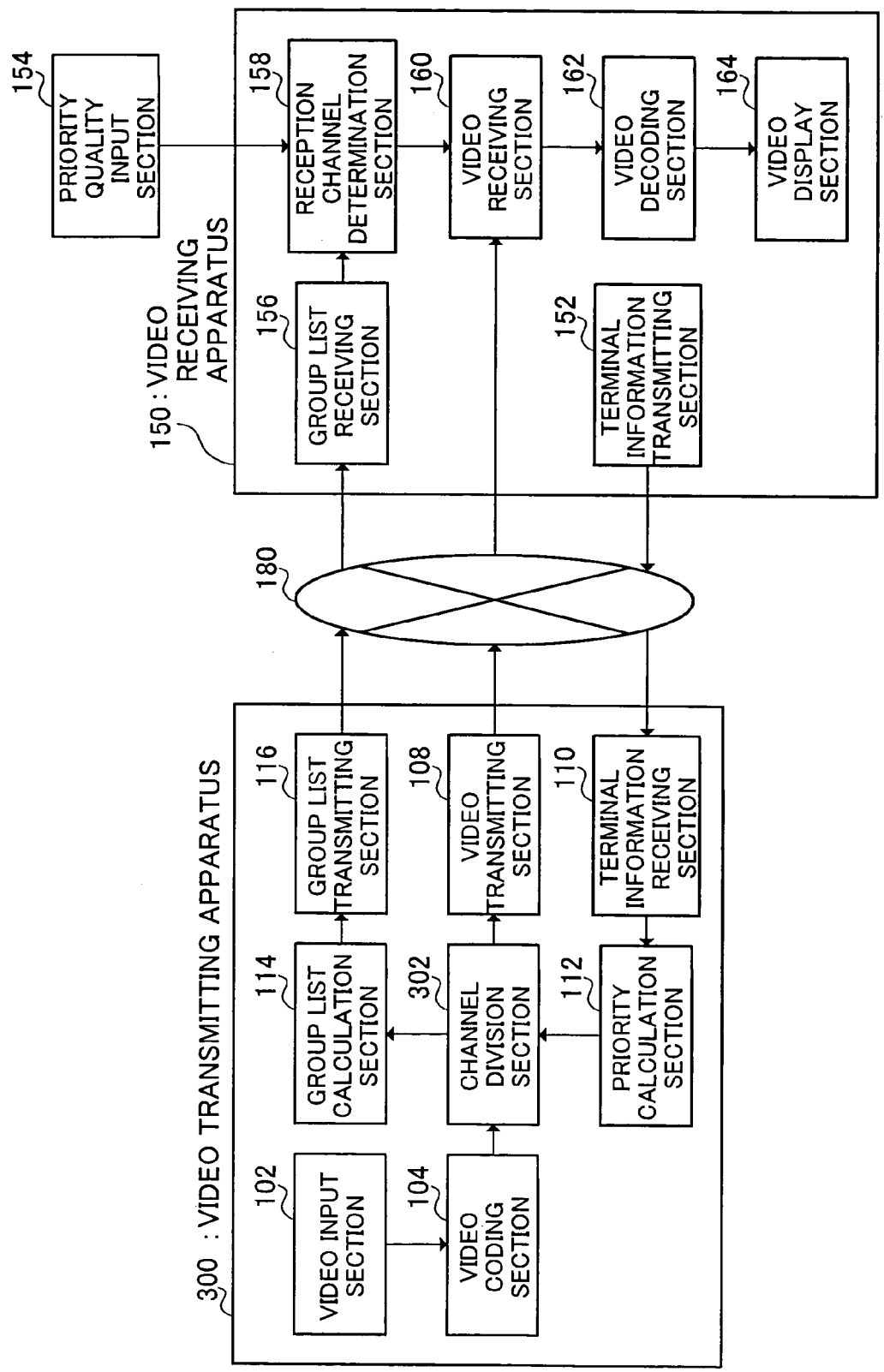
FIG. 15 is a drawing showing the configuration of a video transmission system according to Embodiment 3 of the present invention.

FIG. 15 is a drawing showing the configuration of a video transmission system according to Embodiment 3 of the present invention. A video transmitting apparatus 300 in this video transmission system has a similar basic configuration to that of video transmitting apparatus 100 in the video transmission system shown in FIG. 2, and therefore identical configuration components are assigned the same codes as in FIG. 2, and a description thereof is omitted. Also, video receiving apparatus 150 is exactly the same as shown in FIG. 2, and therefore a description thereof is omitted.

A feature of this embodiment is that, whereas in Embodiment 1 (and Embodiment 2) priorities are assigned to channels, here, transmission is performed with finer priorities assigned to packets within channels. For this reason, video transmitting apparatus 300 has a channel division section 302.

Channel division section 302 divides coded data output from video coding section 104 into a plurality, assigns a separate channel to each of the divided data and adds a priority output from priority calculation section 112, and furthermore performs packet division on a channel-by-channel basis, calculates packet priorities and attaches priorities to packets, outputs divided data to video transmitting section 108, and also outputs a division list to video coding section 104. Details of the processing will be given later herein.

The operation of video transmitting apparatus 300 that has the above configuration will now be described using the flowchart shown in FIG. 16. The flowchart shown in FIG. 16 is stored as a control program in a storage device (such as ROM or flash memory, for example) of video transmitting apparatus 300 not shown in the figure, and executed by a CPU (also not shown).

Figure 16:
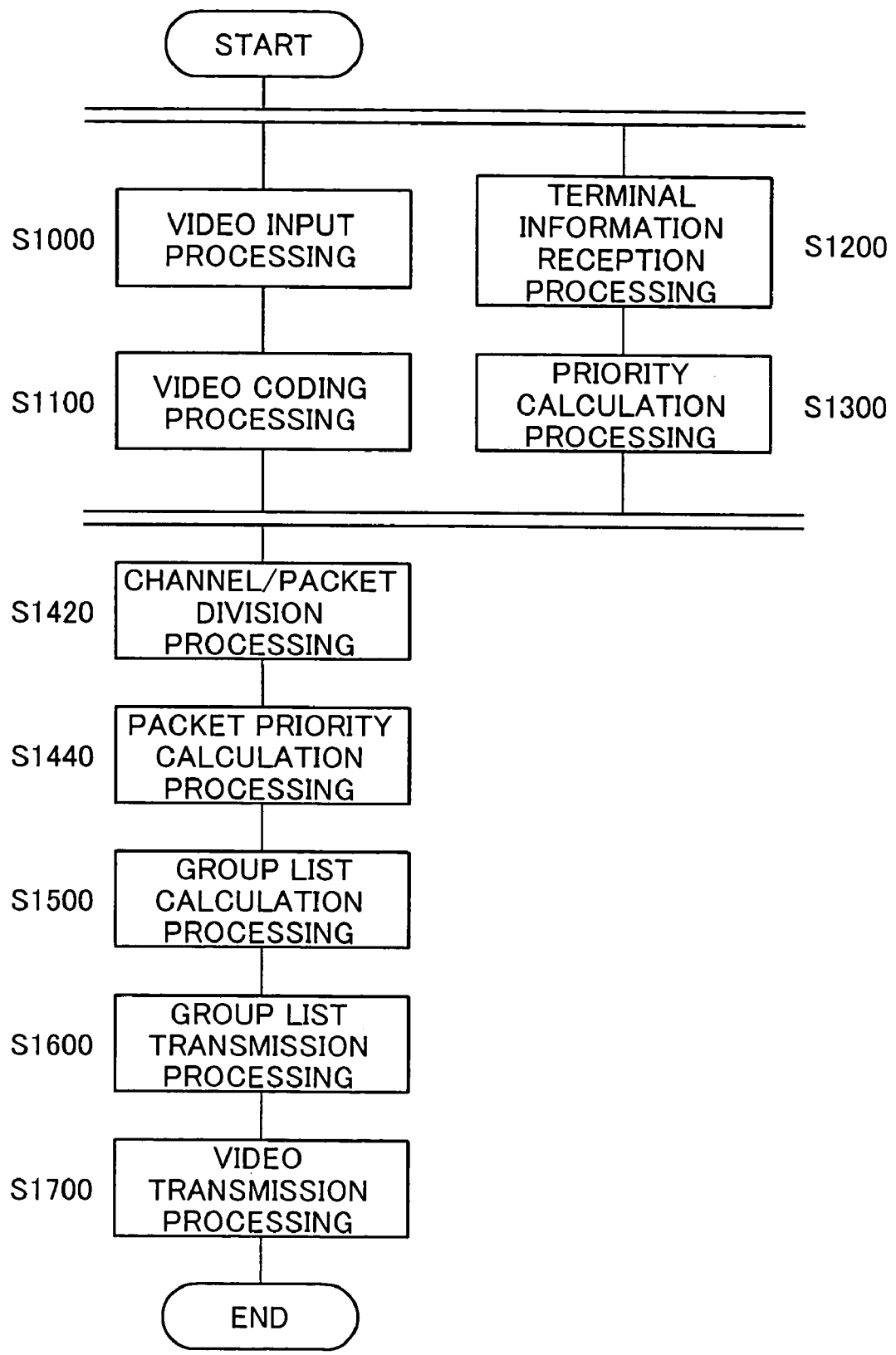
FIG. 16 is a flowchart showing the operation of a video transmitting apparatus corresponding to Embodiment 3.

In this embodiment, as shown in FIG. 16, a step S1420 and step S1440 are inserted in the flowchart shown in FIG. 5, and step S1400 is deleted therefrom.

Step S1000 through step S1300 are the same as the corresponding steps in the flowchart shown in FIG. 5, and therefore a description thereof is omitted.

Then, in step S1420, channel division section 302 performs coded data division in the same way as in Embodiment 1. For example, the base layer (BL) is made one channel, and enhancement layers (EL) 1 through 4 are divided based on predetermined data amounts and made separate channels (see FIG. 4). Priorities output from priority calculation section 112 (see FIG. 8A) are then assigned to the channels (see FIG. 8B).

Next, in step S1440, channel division section 302 further calculates priorities for packets making up channels. Here, a packet is the minimum unit of data transmission, and denotes an IP packet, for example. The actual processing procedure is as follows.

1) Packet Division

Figure 17C:
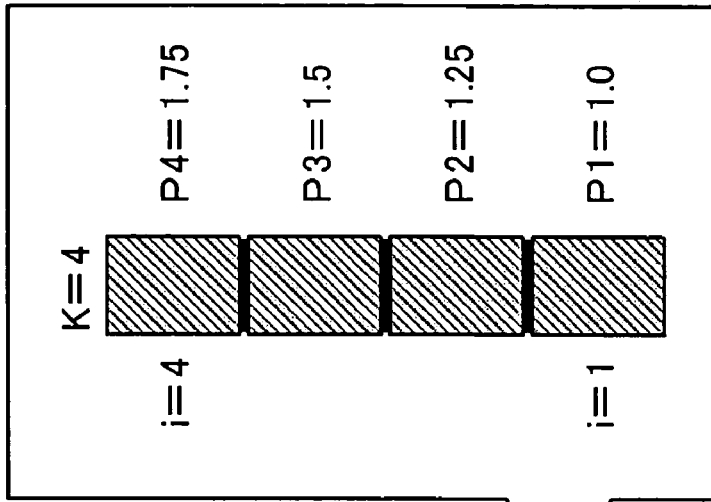
FIG. 17C is a drawing showing an example of packet division and packet priorities.

Packets in a channel are divided into K packet groups, where K is the number of divisions, set beforehand. For example, FIG. 17C illustrates a case where K=4 and channel EL1_1 is divided into four equal parts. The packet division method is not limited to division into equal parts.

2) Packet Priority Calculation

Figure 17B:
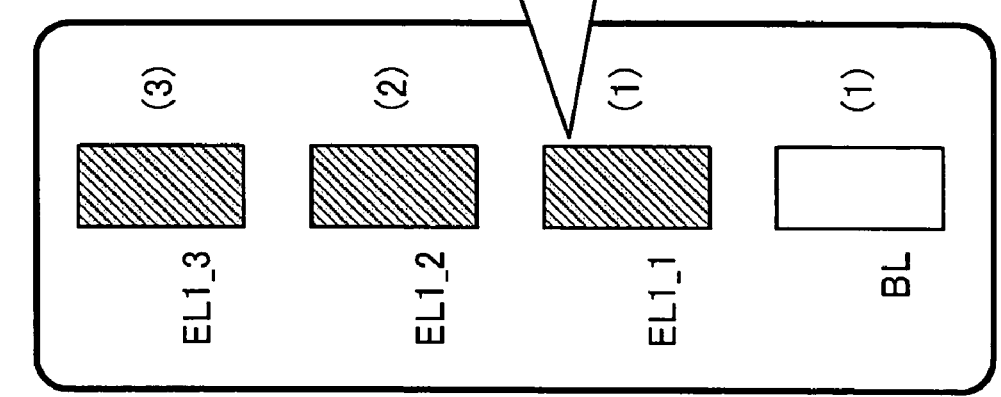
FIG. 17B is a drawing showing some channels after priority assignment based on the above channel priority map.
Figure 17A:
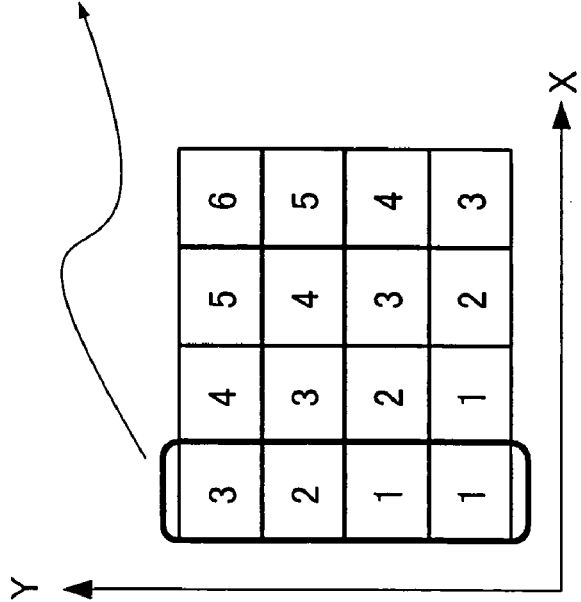
FIG. 17A is a drawing showing an example of a channel priority map.

The priority of each packet is calculated. FIG. 17 shows an example of packet priority calculation. FIG. 17A shows the channel priority map, FIG. 17B shows the channel priorities of enhancement layer 1 (EL1), and FIG. 17C shows an example of packet priorities of packet groups resulting from division of channel EL1_1. In FIG. 17, the lower the number, the higher is the priority indicated.

In the example in FIG. 17C, high priority is calculated from a packet belonging to a low level using channel priority P by means of Equation (2) below.

$$P_i = P + \frac{1}{K}(i-1)$$ Equation (2)

Here, i is the number of the packet group in which a packet is located, $P_1$ is the packet group priority, and K is the channel priority. The packet priority calculation method is not limited to the use of above Equation (2).

A packet priority calculated in this way is assigned to the header of each packet. Coded data with packet priorities attached is output to video transmitting section 108.

Step S1500 through step S1700 are the same as the corresponding steps in the flowchart shown in FIG. 5, and therefore a description thereof is omitted.

Thus, according to this embodiment, layered-coded data is divided into separate channels by quality and bit rate, and transmission is performed with channel priorities assigned based on terminal information, and with fine priorities further assigned to packets within channels, so that, in a transmission bit rate usable by each terminal, it is possible to receive preferentially coded data of quality that is suited to terminal characteristics automatically with finer precision.

In this embodiment, a case has been illustrated in which terminal information is used as the channel priority calculation method in the same way as in Embodiment 1, but this is not a limitation, and it is also possible to use video characteristics in the same way as in Embodiment 2.

Embodiment 4

In this embodiment, a video transmission system is described whereby, by dividing layered-coded data by quality and bit rate and transmitting data on separate channels, and also controlling the type of quality to be given priority according to the receiving terminal reception status, it is possible to receive video of high subjective image quality.

Figure 18:
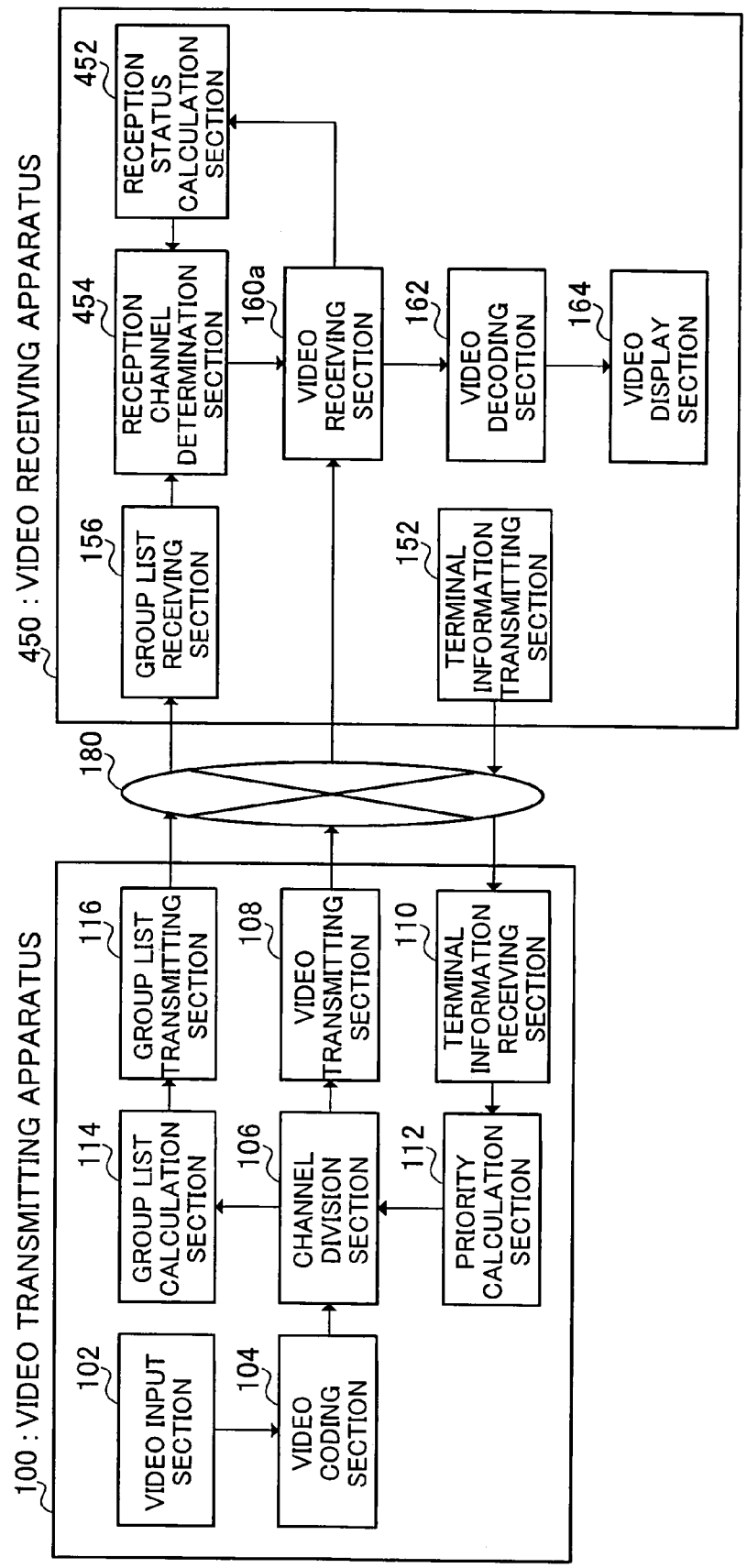
FIG. 18 is a drawing showing the configuration of a video transmission system according to Embodiment 4 of the present invention.

FIG. 18 is a drawing showing the configuration of a video transmission system according to Embodiment 4 of the present invention. A video receiving apparatus 450 in this video transmission system has a similar basic configuration to that of video receiving apparatus 150 in the video transmission system shown in FIG. 2, and therefore identical configuration components are assigned the same codes as in FIG. 2, and a description thereof is omitted. Also, video transmitting apparatus 100 is exactly the same as shown in FIG. 2, and therefore a description thereof is omitted.

A feature of this embodiment is that the type of quality to be given priority is controlled according to receiving terminal reception status (for example, data loss rate or packet loss rate). For this reason, video receiving apparatus 450 has a reception status calculation section 452, reception channel determination section 454, and video receiving section 160a.

In the same way as in video receiving apparatus 150 in FIG. 2, video receiving section 160a receives coded data corresponding to a channel number output from reception channel determination section 454, and outputs the received coded data to video decoding section 162. However, in this embodiment, video receiving section 160a also outputs the total number of reception channels and the total number of channels for which data could be received normally to reception status calculation section 452.

Reception status calculation section 452 calculates reception status using information output from video receiving section 160a. Specifically, reception status calculation section 452 calculates data loss rate L using the total number of reception channels output from video receiving section 160a and the total number of channels that could be received normally, and outputs calculated data loss rate L to reception channel determination section 454. Details of the processing will be given later herein.

Reception channel determination section 454 determines priority quality using data loss rate L output from reception status calculation section 452, determines channel numbers for reception using the determined priority quality and a group list output from group list receiving section 156, and outputs the received channel numbers to video receiving section 160a. If there is no output from reception status calculation section 452 or group list receiving section 156, the channel numbers determined the previous time are output to video receiving section 160a. Details of the processing will be given later herein.

The operation of video receiving apparatus 450 that has the above configuration will now be described using the flowchart shown in FIG. 19. The flowchart shown in FIG. 19 is stored as a control program in a storage device (such as ROM or flash memory, for example) in video receiving apparatus 450 not shown in the figure, and executed by a CPU (also not shown).

Figure 19:
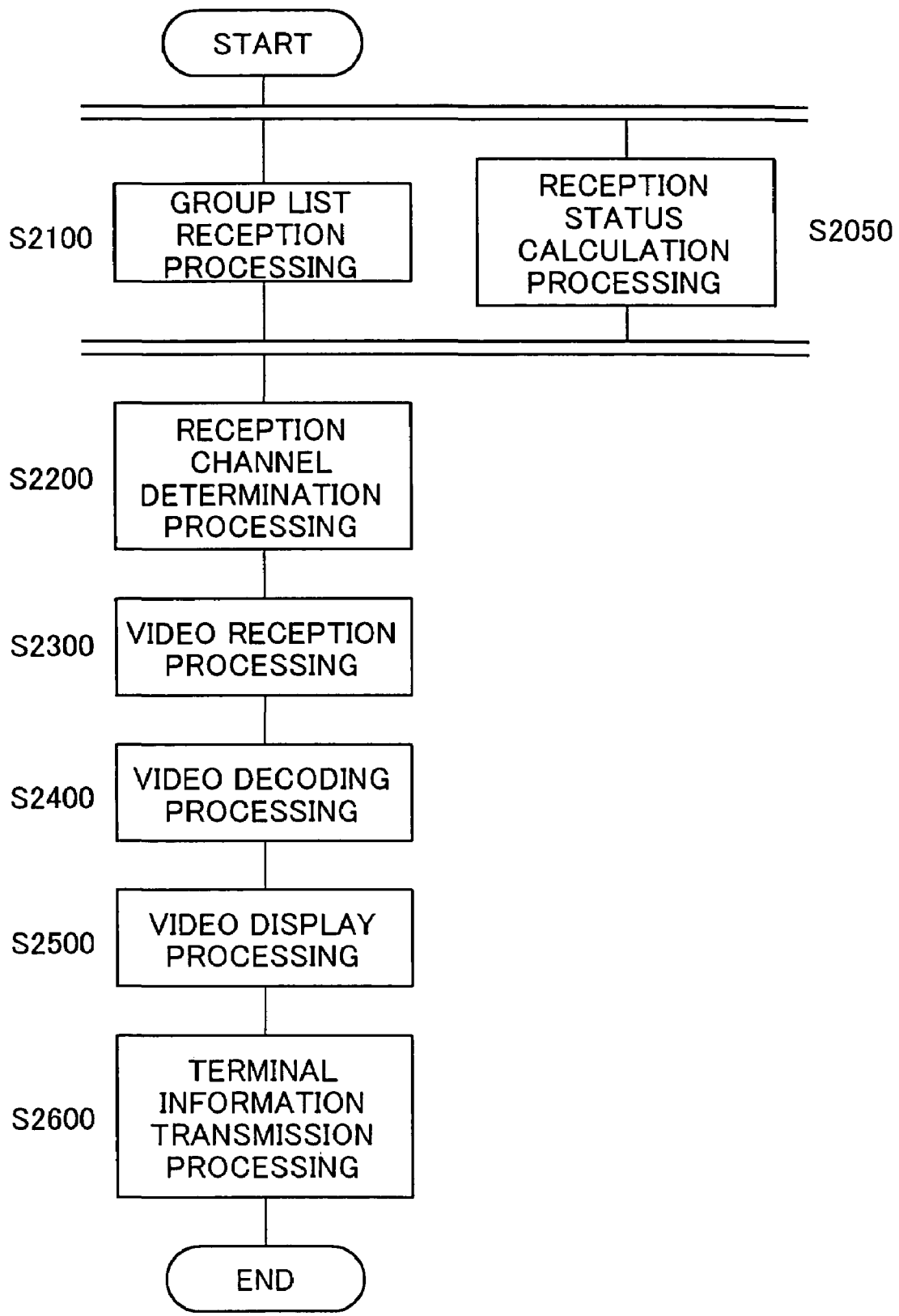
FIG. 19 is a flowchart showing the operation of a video receiving apparatus corresponding to Embodiment 4.

In this embodiment, as shown in FIG. 19, a step S2050 is inserted in the flowchart shown in FIG. 10, and step S2000 is deleted therefrom.

In step S2050, reception status calculation section 452 calculates data loss rate L using information (the total number of reception channels and total number of channels received normally) output from video receiving section 160a, and outputs calculated data loss rate L to reception channel determination section 454. Here, data loss rate L is calculated by means of Equation (3) below, for example.

$$L = \frac{(C_n - T_n)}{C_n}$$ Equation (3)

$C_n$ is the total number of reception channels, and $T_n$ is the number of channels that could be received normally.

The method of calculating data loss rate L is not limited to the above example.

Step S2100 through step S2600 are the same as the corresponding steps in the flowchart shown in FIG. 10, and therefore a description thereof is omitted. In this embodiment, however, the following processing is carried out at the time of reception channel determination processing in step S2200.

Namely, in step S2200, reception channel determination section 454 determines priority quality using data loss rate L output from reception status calculation section 452, and furthermore determines channel numbers for reception using the determined priority quality and a group list output from group list receiving section 156, and outputs the determined channel numbers to video receiving section 160a.

The actual priority quality determination method used here may be as follows, for example. Data loss rate L is compared with a predetermined threshold value TH, and the priority quality is determined. When data loss rate L is high and exceeds threshold value TH (L>TH) motion preference, for which the effect of data loss is small, is selected (in the case of motion priority, the frame rate is high and the effect of packet errors on subjective image quality is small), and when data loss rate L is low and is less than or equal to threshold value TH (L≦TH), image quality preference, for which the influence of data loss is strong, is selected (in the case of image quality preference, the frame rate is low and subjective image quality is greatly degraded by packet errors).

Thus, according to this embodiment, in a video transmission system in which layered-coded data is divided into separate channels by quality and bit rate and transmitted with priorities attached, the data loss rate is calculated using receiving terminal reception status, and when the data loss rate is high, motion preference, for which the frame rate is high and the influence of data loss on subjective image quality is small, is selected, and otherwise image quality priority is selected, so that it is possible to receive video of high subjective image quality irrespective of the reception status. That is to say, reception quality can be improved to suit the reception status.

As described above, according to the present invention, when a plurality of terminals whose characteristics differ receive video simultaneously, each terminal can receive video with quality appropriate for that terminal.

This application is based on Japanese Patent Application No. 2003-053780 filed on Feb. 28, 2003, the entire content of which is expressly incorporated by reference herein.

INDUSTRIAL APPLICABILITY

The present invention has an effect of enabling each terminal to receive video with quality appropriate for that terminal when a plurality of terminals whose characteristics differ receive video simultaneously, and is applicable to a video transmission system that transmits video via a network.

The invention claimed is:

1. A video transmission system whereby layered-coded data is transmitted from a video transmitting apparatus to a video receiving apparatus via a network, said video transmitting apparatus comprising:
a division section that divides the layered-coded data into separate channels by quality or by quality and bit rate;
a first transmitting section that transmits the divided layered-coded data on mutually separate channels;
a calculation section that groups the channels by quality and calculates a group list; and
a second transmitting section that transmits the calculated group list;
and said video receiving apparatus comprises:
a first receiving section that receives the group list transmitted from said video transmitting apparatus;
a determination section that determines a reception channel using the received group list; and
a second receiving section that receives data of the determined reception channel among the divided layered-coded data transmitted from said video transmitting apparatus.

2. The video transmission system according to claim 1, wherein said quality is one of or a combination of two or more of image quality, frame rate, error resilience, spatial resolution, and delay.

3. A video transmitting apparatus comprising:
a division section that divides layered-coded data into separate channels by quality or by quality and bit rate;
a first transmitting section that transmits the divided layered-coded data on mutually separate channels;
a calculation section that groups the channels by quality and calculates a group list; and
a second transmitting section that transmits the calculated group list.

4. The video transmitting apparatus according to claim 3, further comprising a second calculation section that calculates a priority of each channel, wherein:
said division section divides the layered-coded data into the separate channels by quality or by quality and bit rate, and also assigns the calculated channel priority to each channel; and
said first transmitting section transmits the divided layered-coded data on the mutually separate channels to which channel priorities have been assigned.

5. The video transmitting apparatus according to claim 4, wherein said second calculation section calculates the priority of each channel based on receiving terminal information.

6. The video transmitting apparatus according to claim 5, wherein said receiving terminal information is a screen size of a display device of a video receiving apparatus.

7. The video transmitting apparatus according to claim 5, wherein said receiving terminal information is a channel reception status of a video receiving apparatus.

8. The video transmitting apparatus according to claim 4, wherein said second calculation section calculates the priority of each channel based on a video characteristic.

9. A video receiving apparatus comprising:
a first receiving section that receives the group list transmitted from the video transmitting apparatus according to claim 3;
a determination section that determines a reception channel using the received group list; and
a second receiving section that receives data of a determined reception channel among the divided layered-coded data transmitted from said video transmitting apparatus.

10. The video receiving apparatus according to claim 9, further comprising a third calculation section that calculates a reception status, wherein said determination section determines a reception channel using the received group list and calculated reception status.

11. A video transmission method whereby layered-coded data is transmitted from a video transmitting apparatus to a video receiving apparatus via a network, said video transmission method comprising:
a step of having said video transmitting apparatus divide the layered-coded data into separate channels by quality or by quality and bit rate;
a step of having said video transmitting apparatus transmit the divided layered-coded data on mutually separate channels;
a step of having said video transmitting apparatus group the channels by quality and calculate a group list;
a step of having said video transmitting apparatus transmit the calculated group list;
a step of having said video receiving apparatus receive the group list transmitted from said video transmitting apparatus;
a step of having said video receiving apparatus determine a reception channel using the received group list; and
a step of having said video receiving apparatus receive data of the determined reception channel among the divided layered-coded data transmitted from said video transmitting apparatus.

12. The video transmitting apparatus according to claim 6, wherein said second calculation section sets the channel priority high for a channel that raises spatial resolution when said screen size is larger than a predetermined threshold value, and sets the channel priority high for a channel that raises a frame rate when said average screen size is smaller than said predetermined threshold value.

13. The video transmitting apparatus according to claim 7, wherein said second calculation section sets the channel priority high for a channel that improves image quality or spatial resolution when said channel reception status is better than a predetermined threshold value, and sets the channel priority high for a channel that improves a frame rate or error resilience quality when said channel reception status is worse than said predetermined threshold value.

14. The video transmitting apparatus according to claim 8, wherein said second calculation section sets the channel priority high for a channel that improves a frame rate when a video motion is greater than a predetermined threshold value, and sets the channel priority high for a channel that improves image quality or spatial resolution when said video motion is less than said predetermined threshold value.

* * * * *

UNITED STATES PATENT AND TRADEMARK OFFICE
CERTIFICATE OF CORRECTION

PATENT NO. : 7,382,729 B2  Page 1 of 1
APPLICATION NO. : 10/514440
DATED : June 3, 2008
INVENTOR(S) : Yoshimasa Honda et al.

It is certified that error appears in the above-identified patent and that said Letters Patent is hereby corrected as shown below:

Please add in the following on the front page of the patent:

Title page, item should read as follows:

(30)    Foreign Application Priority Data

Feb. 28, 2003    (JP)    2003-053780

Signed and Sealed this

Tenth Day of February, 2009

JOHN DOLL
*Acting Director of the United States Patent and Trademark Office*